(12) United States Patent
Layden et al.

(10) Patent No.: US 7,132,833 B2
(45) Date of Patent: Nov. 7, 2006

(54) SYSTEM FOR DETECTING DEFECTIVE BATTERY PACKS

(75) Inventors: David Layden, Lisbon, WI (US); Craig Edevold, Tomah, WI (US); Cary Winch, Necedah, WI (US); Donald Zahrte, Sr., Necedah, WI (US)

(73) Assignee: Powerware Corporation, Raleigh, NC (US)

( * ) Notice: Subject to any disclaimer, the term of this patent is extended or adjusted under 35 U.S.C. 154(b) by 781 days.

(21) Appl. No.: 10/031,815

(22) PCT Filed: Mar. 29, 2001

(86) PCT No.: PCT/US01/10083

§ 371 (c)(1),
(2), (4) Date: Jan. 17, 2002

(87) PCT Pub. No.: WO01/73914

PCT Pub. Date: Oct. 4, 2001

(65) Prior Publication Data

US 2002/0136042 A1    Sep. 26, 2002

(51) Int. Cl.
*H02J 7/00* (2006.01)
(52) U.S. Cl. .................................. 324/429; 320/116
(58) Field of Classification Search ............... 324/429, 324/434; 320/116, 118; 307/66; 361/797
See application file for complete search history.

(56) References Cited

U.S. PATENT DOCUMENTS

| 3,626,270 | A | * | 12/1971 | Burkett et al. ............... 320/129 |
| 3,816,805 | A | * | 6/1974 | Terry ........................... 320/123 |
| 3,886,426 | A | * | 5/1975 | Daggett ....................... 320/117 |
| 4,316,185 | A | | 2/1982 | Watrous et al. |
| 4,460,870 | A | * | 7/1984 | Finger ......................... 324/429 |
| 5,332,927 | A | * | 7/1994 | Paul et al. .................... 307/66 |
| 5,570,740 | A | | 11/1996 | Flores et al. |
| 5,982,652 | A | | 11/1999 | Simonelli et al. |
| 6,014,012 | A | * | 1/2000 | Murao et al. ............... 320/116 |
| 6,020,743 | A | | 2/2000 | Reeves et al. |
| 6,310,783 | B1 | * | 10/2001 | Winch et al. ............... 361/797 |

FOREIGN PATENT DOCUMENTS

EP    0 977 047 A2    2/2000

OTHER PUBLICATIONS

Arto Glad, Pekka Waltari, Teuvo Suntio, Middle Point Voltage Comparison as a Simple and Practical but Effective Way to Ensure Battery System's Capacity to Perform, Intelec '91—13th International Telecommunications Energy Conference, ISBN No. 0-87942-670-5, IEEE Catalog No. 91CH2970-2, Piscataway, NJ.
Kevin E. White, A Systems Approach to Telecom Battery Monitoring and Control Using The Rectifier Power Plant, Intelec '96—18th International Telecommunications Energy Conference, ISBN No. 0-7803-3507-4, IEEE Catalog No. 96CH35965, Piscataway, NJ.

* cited by examiner

*Primary Examiner*—Pia Tibbits
(74) *Attorney, Agent, or Firm*—Reinhart Boerner Van Deuren P.C.

(57) ABSTRACT

An electrical cabinet for an uninterruptibe power supply (UPS) system includes universal slots that can receive power modules, battery packs, or chargers. The back plane of the slot has connector terminals for battery packs and power modules. The cabinet can be easily reconfigured as desired by changing the number of power modules chargers or battery packs installed. Circuitry is provided that indicates the capacity and operational readiness of the cabinet. This circuitry monitors the battery packs in each slot, and isolates any detected fault to a particular pack.

27 Claims, 14 Drawing Sheets

SYSTEM FOR DETECTING DEFECTIVE BATTERY PACKS

The international application was published under PCT Article 21(2) in English.

FIELD OF THE INVENTION

The present invention relates generally to modular uninterruptible power supply (UPS) systems, and more particularly relates to battery monitoring systems for use in such UPS systems.

BACKGROUND OF THE INVENTION

Increasingly, businesses, hospitals, utilities, and even consumers are relying on electronic and computerized equipment to conduct their daily activities. Indeed, as we progress through the new economy in the information age, the amount of reliance and the required sophistication of the electonic equipment used will only increase. Unfortunately, such increased use and sophistication of the electronic equipment brings an increased demand for reliable, quality electric power without which operations may be disrupted and critical data lost.

Despite the advances in the sophistication and availability of electronic and computerized equipment, the availability and reliability of high quality electric power and the quantities demanded by the growing economy has not kept pace. Indeed, while many utilities believe that rolling brown-outs provide an adequate solution to their inability to supply the electric power required by their customers, the impact that such brown-outs has on a business' productivity and profitability is, quite simply, unacceptable.

In addition to the utilities' inability to reliably supply the amount of electric power required, the quality of the power that is supplied often is so poor so as to affect the operation of the modern sophisticated electronic and computer equipment. Voltage sags and spikes are relatively common on the utility power lines, particularly during periods of factory shift changes in industrialized areas. Other power quality problems may be introduced by natural causes such as lightning induced voltage spikes, voltage droops caused by accidental contact with power distribution equipment by animals, tree limbs, etc. Oftentimes, these power quality perturbations have a more detrimental effect on the electronic and computerized equipment than complete power losses because the operating characteristics of the components of such equipment varies. That is, some portions of the electronic equipment may cease operating before other portions shut down, possibly resulting in erroneous operation, corrupted data, etc.

To overcome these and other problems resulting from the lack of the quantity and quality of electric power required by the modern electronic and computerized equipment, uninterruptible power supply systems have been developed. These systems typically allow the main utility power to supply the connected load during periods of availability of high quality utility generated electric power. However, during periods of utility power loss or substandard quality, these systems will stop utilizing the utility power input and switch to an alternate source of electric power to generate the required output for the connected loads. Most often, this alternate source of electric power is from a number of electric storage batteries. Even in systems that may utilize a motor-driven electric power generator, batteries are still typically utilized to bridge the gap between the loss of utility power and the availability of the motor-driven generator, which typically requires a finite period of time after it is started before it is capable of powering the connected loads. Because the applications vary greatly in their type, size and configuration, powering requirements, signal requirements and the like, it will be readily appreciated to those skilled in the art that one size fits all does not apply and the one size and form of an uninterruptible supply systems can not meet the requirements of all applications. Indeed, it is often the case that each application requires a significantly different configuration of an UPS system.

The two basic components used in UPS systems include battery packs and power modules. It is also desirable in certain applications to use battery chargers in the UPS systems. Battery packs have positive and negative terminals which can be connected together in parallel or series to provide the desired combined DC voltage and amperage. Power modules are much different than battery packs and can serve the purpose of signal conditioning and converting DC electrical power into AC electrical power. Because power modules are typical controlled through electronic control signals, power modules must have several inputs and several outputs. As such, power modules use much more complex terminal connectors than battery packs with several input pins and several output pins.

The electric power storage batteries used in typical uninterruptible power supply systems are constructed from a number of individual battery cells that are coupled in series to generate the output voltage required for the system. Since each of the individual battery cells are required to generate the proper output voltage, proper operation of each of the battery cells is paramount to the system's ability to properly supply quality output power to the connected loads to prevent the problems discussed above. The existence of an undetected failed cell may result in a system crash during periods of utility power outage when the batteries are called upon to supply the connected load. Alternatively, the duration or quality of the output power supplied by the system for the batteries may be greatly reduced, which is also unacceptable from a user standpoint.

To avoid the continued existence of a failed battery cell, some form of battery health monitoring for the UPS system is required. One such monitoring system is described in a paper presented at the 13th International Telecommunications Energy Conference held in Kyoto, Japan, on Nov. 5–8, 1991 entitled Middle Point Voltage Comparison as a Simple and Practical but Effective Way to Ensure Battery Systems Capacity to Perform, written by Arto Glad, Pekka Waltari, and Teuvo Suntio. The monitoring system proposed by this paper uses a voltage signal UWD used to represent the "middle point" voltage as determined to be the voltage deviation between a fixed reference voltage and the "middle point" voltage of the battery string. Unfortunately, this paper concludes that the battery string must be discharged before "the real anomalies" can be detected. Specifically, this paper states that the absolute health of the batteries can be revealed only by discharging about 70–80% or more of the batteries' capacity. Likewise, in another paper presented at the $18^{th}$ International Telecommunications Energy Conference on Oct. 6–10, 1996, in Boston, Mass., entitled "A Systems Approach to Telecom Battery Monitoring and Control Using the Rectifier Power Plant" written by Kevin E. White, also requires that the battery be discharged significantly before the health of the battery may be determined. Indeed, this later paper indicates that the float voltage provides no hint of a weak battery, and requires that all battery testing be performed under load.

While the systems proposed in the above-identified papers may well provide adequate monitoring of the health of the batteries, the requirement of discharging 70–80% of the batteries' capacity merely to determine the health of the batteries carries with it significant risks that jeopardize the uninterruptible power supply system's ability to supply the connected load in the event of any utility power failure occurring during or within a period of several hours after the monitoring has occurred, depending on the ability of the system to recharge the batteries to their full capacity after having been discharged 70–80%. Further, the complexity of the circuitry required to disable or limit the utility power line input adds significantly to the cost and complexity of such a monitoring system, while reducing the overall system reliability; a combination which is particularly troublesome for a system that is meant to increase the reliable operation of electronic and computer equipment.

Therefore, there is a need in the art for a monitoring system that is able to ensure the health and operability of the batteries utilized in an uninterruptible power supply system without requiring that these batteries be discharged during the monitoring operation.

BRIEF SUMMARY OF THE INVENTION

The system of the invention provides a new and improved uninterruptible power supply (UPS) system including a modular cabinet or chassis providing extensibility and reconfigurability of the UPS. This extensibility and reconfigurability is made possible through the provision of common receiving locations in the cabinet or chassis adapted to receive any one of the components of which the UPS is comprised. Specifically, each receiving location of the modular cabinet or chassis is adapted to receive power modules, battery packs, and battery chargers. This provides maximum flexibility for the consumer who is now able to fully configure the UPS to his or her own particular needs, and to fully reconfigure the UPS as his or her needs change, all without the necessity of purchasing separate cabinets.

In one embodiment of the invention, an electrical cabinet for configuring an uninterruptible power system comprises a plurality of receiving locations each adapted to receive either of a power module and a battery pack. In this embodiment, each receiving location includes a terminal connector that includes a power connector adapted to electrically connect with the battery pack, and a signal connector adapted to electrically connect with the power module. Further, each receiving location preferably includes two separate terminal connectors arranged in non-interfering locations. Preferably, the signal connector and the power connector are arranged in a single terminal connector along a common strip to which the power modules are adapted to connect.

The electrical cabinet of the invention further comprises partitions dividing the receiving locations into slots. A user interface is adapted to provide a status of each receiving location indicative of the use of the receiving location. This is aided in one embodiment by the inclusion of sensing circuitry for each receiving location indicating to the user interface the type of device positioned in the receiving location.

In a further embodiment of the invention, each receiving location is adapted to receive at least two battery packs. In this embodiment, each receiving location includes a pair of terminal connectors, one for each different battery pack. To accommodate the typical inclusion of a fan in each power module, each receiving location including a vent arranged to be in close proximity to this fan.

A non-invasive method of monitoring operational readiness of electric power storage batteries in the uninterruptible power supply (UPS) system is also presented. The UPS system includes at least one battery channel, each having at least two battery packs coupled in series to supply output power to a connected load. A battery charger is also preferably included to maintain and restore charge to the batteries during normal utility line operation. In this system, the method comprises the steps of monitoring the voltage at the midpoint between the two battery packs during a quiescent state of operation of the battery packs. This voltage is compared to a nominal value for the midpoint voltage during the quiescent state of operation, and a lack of operational readiness of both battery packs is indicated when the voltage at the midpoint is less than the nominal value by a predetermined amount.

In UPS systems having a number of battery channels coupled in parallel with one another, the step of monitoring comprises the step of monitoring a voltage for each of the parallel coupled battery channels at the midpoint. In such a system, the method further includes the steps of calculating the nominal value for the midpoint voltage during the quiescent state of operation of the battery packs as the average of the voltages monitored for each parallel coupled battery channel. A lack of operational readiness of a battery channel is then indicated when the voltage at the midpoint of the battery packs for that channel is less than the nominal value by the predetermined amount.

In further embodiment, the method also includes the steps of monitoring the voltage at the midpoint during float charging of the battery packs and comparing the voltage to a nominal value during the float charging. A lack of operational readiness of one of the two battery packs may then be indicated when the voltage at the midpoint varies from this nominal value by a predetermined amount. The indication a lack of operational readiness may identify one of the two battery packs when the voltage at the midpoint is greater than the nominal value by the second predetermined amount, and the other of the two when the voltage at the midpoint is less than the nominal value by the predetermined amount.

In UPS systems that include a number of battery channels coupled in parallel with one another, an embodiment of the present invention monitors the voltage for each of the parallel coupled battery channels at the midpoint between the two battery packs during the float charging. The method then calculates the nominal value for the midpoint voltage during the float charging of the battery packs as the average of the voltages monitored for each parallel coupled battery channel A lack of operational readiness of a battery channel is then indicated when the voltage at the midpoint of the battery packs for that channel varies from the nominal value by the predetermined amount. A lack of operational readiness of one of the two battery packs of that battery channel may also be indicated when the voltage at the midpoint is greater than the nominal value by the predetermined amount, and of the other of the two battery packs when the voltage at the midpoint is less than the nominal value by the predetermined amount.

In a further embodiment, the method also includes the steps of monitoring the voltage at a midpoint between the two battery packs at a state of discharge of the battery packs, and comparing this voltage to a nominal value for the midpoint voltage during the state of discharge. A lack of operational readiness of one of the two battery packs may then be indicated when the voltage at the midpoint varies from the nominal value by a predetermined amount. A lack of operational readiness of one of the two battery packs is indicated when the voltage at the midpoint is less than the nominal value by the third predetermined amount, and of a second one of the two battery packs when the voltage at the midpoint is greater than the nominal value by the predetermined amount.

In UPS systems including a number of battery channels coupled in parallel with one another, a further embodiment monitors the voltage for each of the parallel coupled battery channels at the midpoint between the two battery packs during the state of discharge. In this embodiment, the method of the present invention includes the step of calculating the nominal value for the midpoint voltage during the state of discharge as the average of the voltages monitored for each parallel coupled battery channel A lack of operational readiness of a battery channel may then be indicated when the voltage at the midpoint of the battery packs for that channel varies from the nominal value by the predetermined amount. A lack of operational readiness of one of the two battery packs of that battery channel may be indicated when the voltage at the midpoint is less than the nominal value by the predetermined amount, and of the other of the two battery packs of that battery channel when the voltage at the midpoint is greater than the nominal value by the predetermined amount.

In another embodiment of the present invention, a method of detecting and identifying a failed battery pack in an uninterruptible power supply (UPS) system is also presented. Preferably, the UPS system includes a plurality of parallel connected slots into which may be coupled battery packs, power modules, or battery chargers as determined and configured by a user. The slots are adapted to accommodate two battery packs and to provide a series coupling therebetween. This method comprises the steps of detecting a presence and type of equipment installed in each slot, monitoring a voltage present at the series coupling between the two battery packs for each slot into which is installed battery packs, calculating an average midpoint voltage for all slots having battery packs installed, comparing the voltage for each slot to the average midpoint voltage for all slots, and identifying a failed battery pack within a slot when the voltage for its associated slot deviates from the average midpoint voltage by a predetermined amount.

In a further embodiment, the method also includes the steps of comparing the voltage for each slot to a predetermined expected value, and identifying a failed battery pack within a slot when the voltage for its associated slot deviates from the predetermined expected value by a predetermined amount. Preferably, the method also includes the step of determining an operating mode of the battery packs. In this embodiment the step of comparing the voltage for each slot to a predetermined expected value comprises the step of comparing the voltage for each slot to an operating mode specific predetermined expected value. The step of identifying a failed battery pack within a slot may then include the step of identifying a failed battery pack within a slot when the voltage for its associated slot deviates from the operating mode specific predetermined expected value by a predetermined amount.

A system for detecting defective battery packs in a modular, redundant uninterruptible power supply (UPS) system is also presented. As discussed, the UPS system includes a number of parallel connected slots into which may be coupled the battery packs, power modules, or battery chargers as determined and configured by a user. Each slot is adapted to accommodate two battery packs and to provide a series coupling between them. This system comprises a voltage sense circuit coupled to each series coupling of each slot. A voltage sense selector circuit is coupled to each of the voltage sense circuits to selectively enable them. A controller is coupled to the voltage sense selector circuit to command the voltage sense selector circuit to enable a particular voltage sense circuit for a particular slot. The controller then reads the voltage sense signal for that particular slot from the voltage sense circuit. The controller compares the voltage sense signal for the particular slot to a predetermined expected value. It then identifies an operational status of the battery packs based on this comparison.

Preferably, the controller reads the voltage sense signal for each slot in which battery packs are installed, calculates an average voltage value, and compares the voltage sense signal for each slot to the average voltage value to identify the operational status of the battery packs for each slot. The controller may also read the voltage sense signal for each slot in which battery packs are installed during a float charge mode. It then compares the voltage sense signal for each slot to an expected voltage value for the float charge mode, and identifies one of the battery packs in a slot as defective when the voltage sense signal for the associated slot is less than the expected voltage value for the float charge mode. The other of the battery packs in a slot is identified as defective when the voltage sense signal for the associated slot is greater than the expected voltage value for the float charge mode. The controller also preferably reads the voltage sense signal for each slot in which battery packs are installed during a discharge mode, compares the voltage sense signal for each slot to an expected voltage value for the discharge mode, and identifies one of the battery packs in a slot as defective when the voltage sense signal for the associated slot is less than the expected voltage value for the discharge mode. The other one of the battery packs in a slot is identified as defective when the voltage sense signal for the associated slot is greater than the expected voltage value for the discharge mode.

In one embodiment of the present invention, the voltage sense selector circuit comprises a shift register having a clock input and a slot select input from the controller. The shift register sequentially generates a number of output enable signals in response to the clock input and the slot select input from the controller. Each of the output enable signals operates to turn on a switching element to connect the voltage sense circuit to the controller. Preferably, the switching element is a metal oxide silicon field effect transistor (MOSFET).

In one embodiment, the electrical cabinet further comprises a support base, support bars spaced apart in a rectangular relationship extending vertically from the support base, side panels extending vertically between different pairs of the four support posts, and a number of shelves extending horizontally between the four support posts. In this embodiment, the receiving locations are defined between the adjacent shelves. The cabinet further includes a back panel associated with the receiving locations. The back panel extends generally perpendicular to the shelves and transversely between the side panels and two of the support bars, supporting the terminal connectors. Preferably, the shelves, the side panels, and the support bars are manufactured from sheet metal material. Pairs of the support bars are further connected and maintained in spaced relation by a web of sheet metal material.

In an alternate embodiment, an electrical cabinet for configuring an uninterruptible power system with battery packs and modules comprises a support housing and a number of universal bays defined in the support housing and sized to receive either of a battery pack and a power module. The electrical cabinet further includes a terminal connector for each universal bay comprising a power connector adapted to electrically connect with the battery pack and a signal connector adapted to electrically connect with the power module. Preferably, each universal bay includes two terminal connectors arranged in non-interfering locations. The housing further defines a guide surface for each universal bay. This guide surface is adapted to guide the battery pack into electrical connection with the power connector and the power module into electrical connection with the signal connector. Preferably, each of the signal and power connectors also include a guide mechanism that interacts with a corresponding guide mechanism on either of the battery pack and power module. The guide surface is adapted to first locate the corresponding guide mechanisms for interaction, and then guide the battery packs and power modules into electrical connection with the power connectors and signal connectors, respectively.

In one embodiment, the signal connector and the power connector are arranged in a single terminal connector along a common strip. Further, the power module is adapted to connect to the power connector in addition to the signal connector. Preferably, the electrical cabinet further comprises a user interface adapted to provide a status of each universal bay indicative of the use of the universal bay. Additionally, each universal bay comprises a sensor circuit indicating to the user interface the type of device positioned in the universal bay.

In an alternate embodiment of the present invention, a back panel for use in an electrical cabinet of a modular uninterruptible power supply (UPS) system is presented. The UPS is capable of including any combination or exclusion of battery packs, power modules, and battery chargers within the capacity of the electrical cabinet, which has a plurality of identical receiving locations capable of receiving any one of the power modules, battery packs, and battery chargers. In this embodiment of the invention, the back panel comprises a backplane and a first terminal connector. This terminal connector comprises a power connector mounted on the backplane and adapted to electrically connect with the battery pack, the power module, and the battery charger. The terminal connector also includes a signal connector mounted on the backplane and adapted to electrically connect with the power module and the battery charger.

In one embodiment of the back panel, the backplane comprises a printed circuit board having power traces and signal traces included therein. These power traces and signal traces are operably coupled to the power connector and the signal connector, respectively. Preferably, the back panel further comprises a second terminal connector positioned in a non-interfering relationship with the first terminal connector. In a further embodiment, the back panel comprising a guide member rigidly mounted on the backplane. This guide member is adapted to receive flanges on the battery packs, power modules, and battery chargers to ensure proper positioning of the battery packs, power modules, and battery chargers for engagement with the terminal connector.

In a further alternate embodiment of the present invention, an uninterruptible power system (UPS) comprises an electrical cabinet having a plurality of universal receiving locations defined therein. These universal receiving locations are adapted to receive battery packs and power modules. The UPS further comprises a power module positioned within one of the universal receiving locations and a battery pack positioned within another one of the universal receiving locations. Preferably, the universal receiving locations are further adapted to receive battery chargers, and the UPS further comprises a battery charger positioned within a third of the universal receiving locations. Additionally, in one embodiment each of the universal receiving locations comprises a terminal connector having a power connector and a signal connector positioned to electrically connect with both the power module and the battery pack upon insertion.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
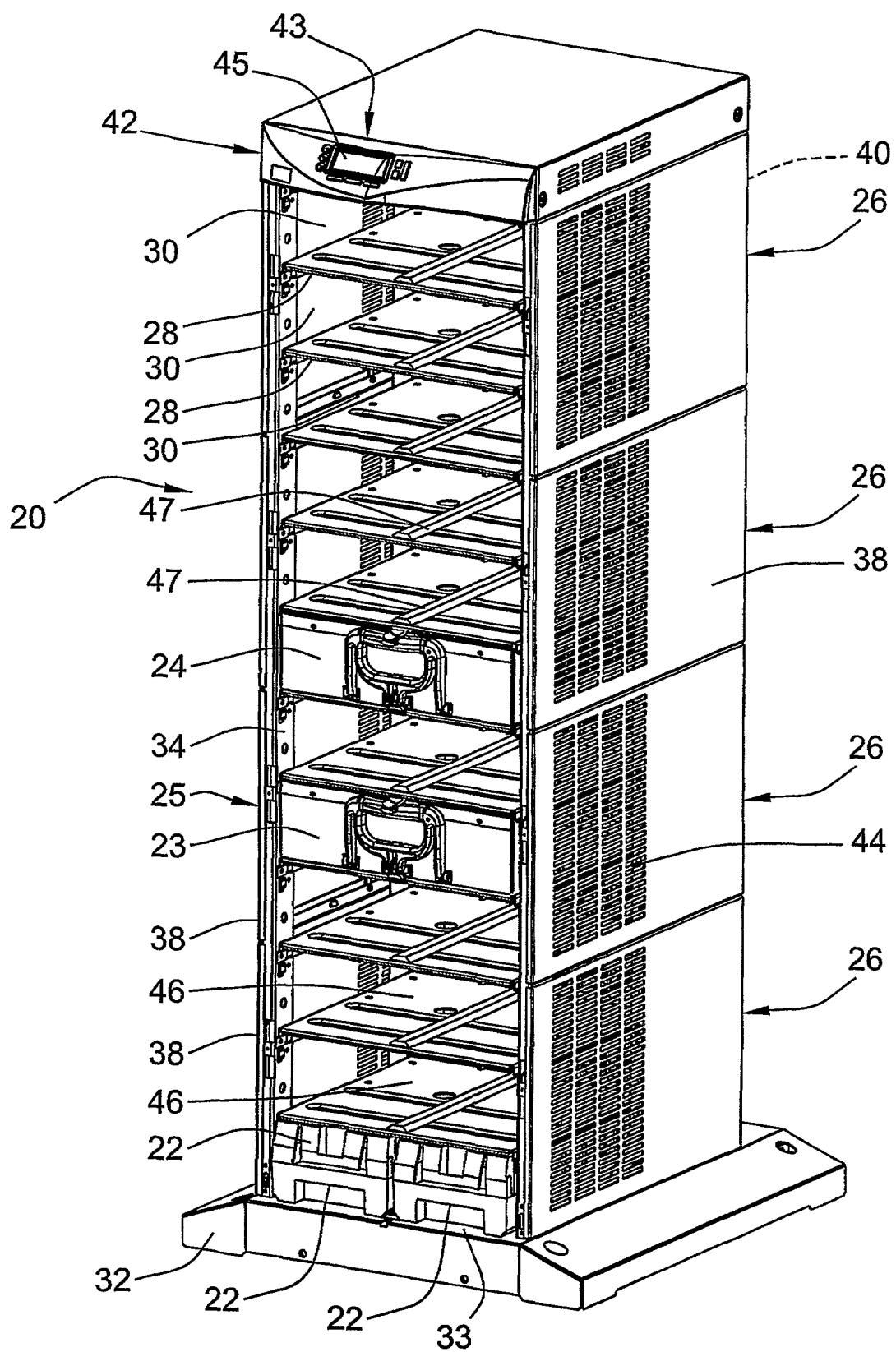
FIG. 1 is an isometric view of an electrical cabinet or chassis for configuring and supporting an UPS system, according to an embodiment of the present invention.
Figure 2:
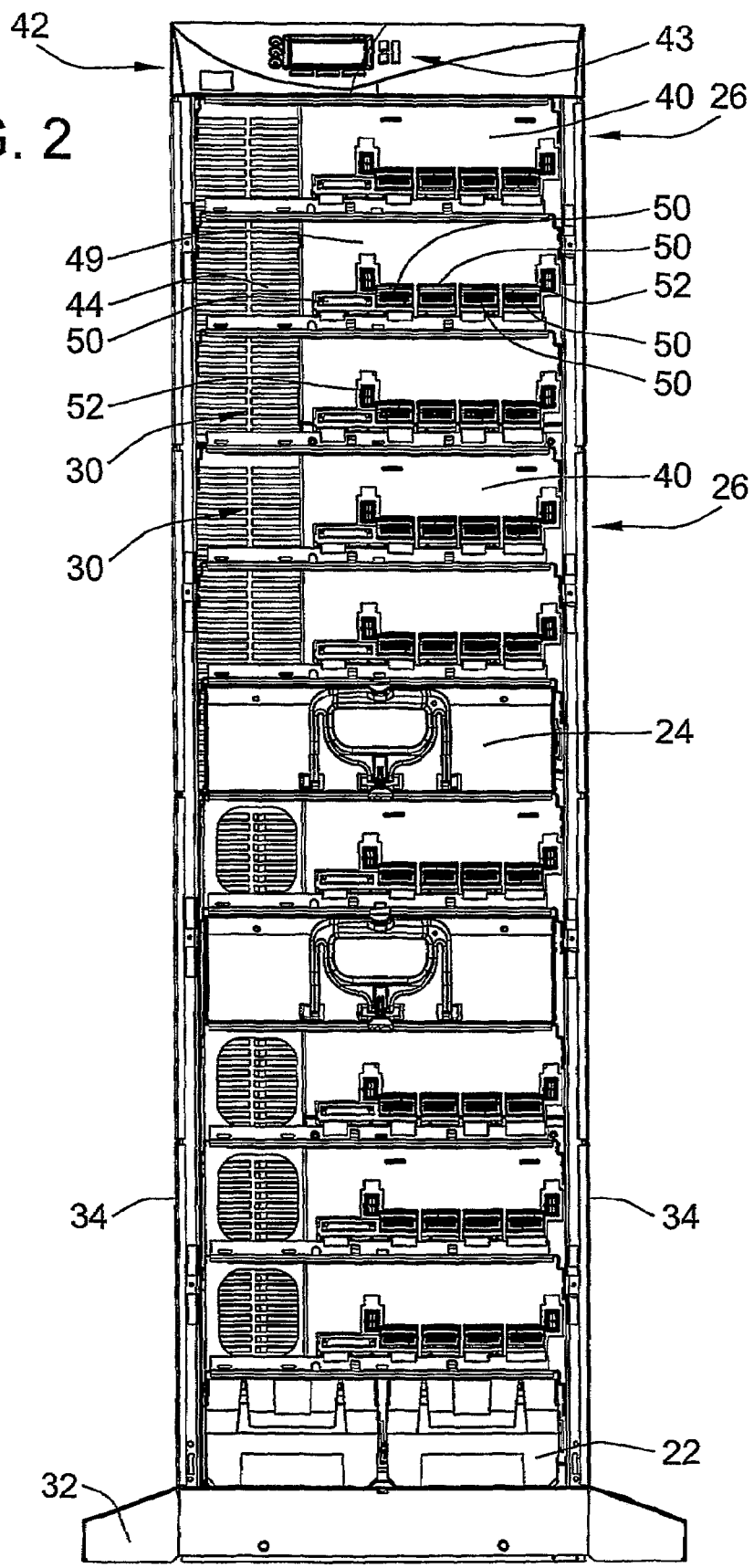
FIG. 2 is a front view of the electrical cabinet illustrated in FIG. 1.

For purposes of illustration, an embodiment of the present invention is depicted in FIGS. 1 and 2 as a modular chassis or electrical cabinet 20 for supporting and organizing battery packs 22 and power modules 24 into an uninterruptible power supply system (UPS) for such exemplary applications as providing power to computer networks, telecommunications equipment and any other application where an uninterrupted power source is desired. The cabinet 20 is also capable of holding battery chargers 23 if desired, which are contained in the same type of drawer support structure or module housing 25 as the power modules 24 and plug into the back panel in a similar manner. The module housing 25 slides horizontally and locks into the inserted position. Further details of the module housing 25 and associated locking handle structure are described in U.S. patent application Ser. No. 09/538,056 entitled, "MULTI-FUNCTION HANDLE AND MODULAR CHASSIS INCORPORATING SAME", assigned to the present assignee, the entire disclosure of which is hereby incorporated by reference.

As illustrated in FIGS. 1 and 2, the cabinet 20 is divided up into individual sections 26 to provide a vertical stack. In this embodiment, each section 26 provides three bays or slots 30 for receiving the battery packs 22 or power modules 24. In this manner, electrical cabinets having only three slots, or alternatively six, nine or twelve or more slots can be readily made utilizing a single size of side panels 38. It will be appreciated by those skilled in the art that each section need only have one slot 30, but making each section with multiple slots is advantageous from practicality and manufacturing standpoints. Other slot configurations are also possible including side by side horizontal slots as an alternative or in addition to the vertically spaced slots as shown. Each battery pack 22 is housed laterally side by side in the illustrated embodiment such that each battery pack 22 may be inserted separately, which reduces the exertion of the service technician due to the typical heavy weight of such battery packs 22. Fewer or more battery packs may also be provided in other embodiments of the invention.

Figure 11:
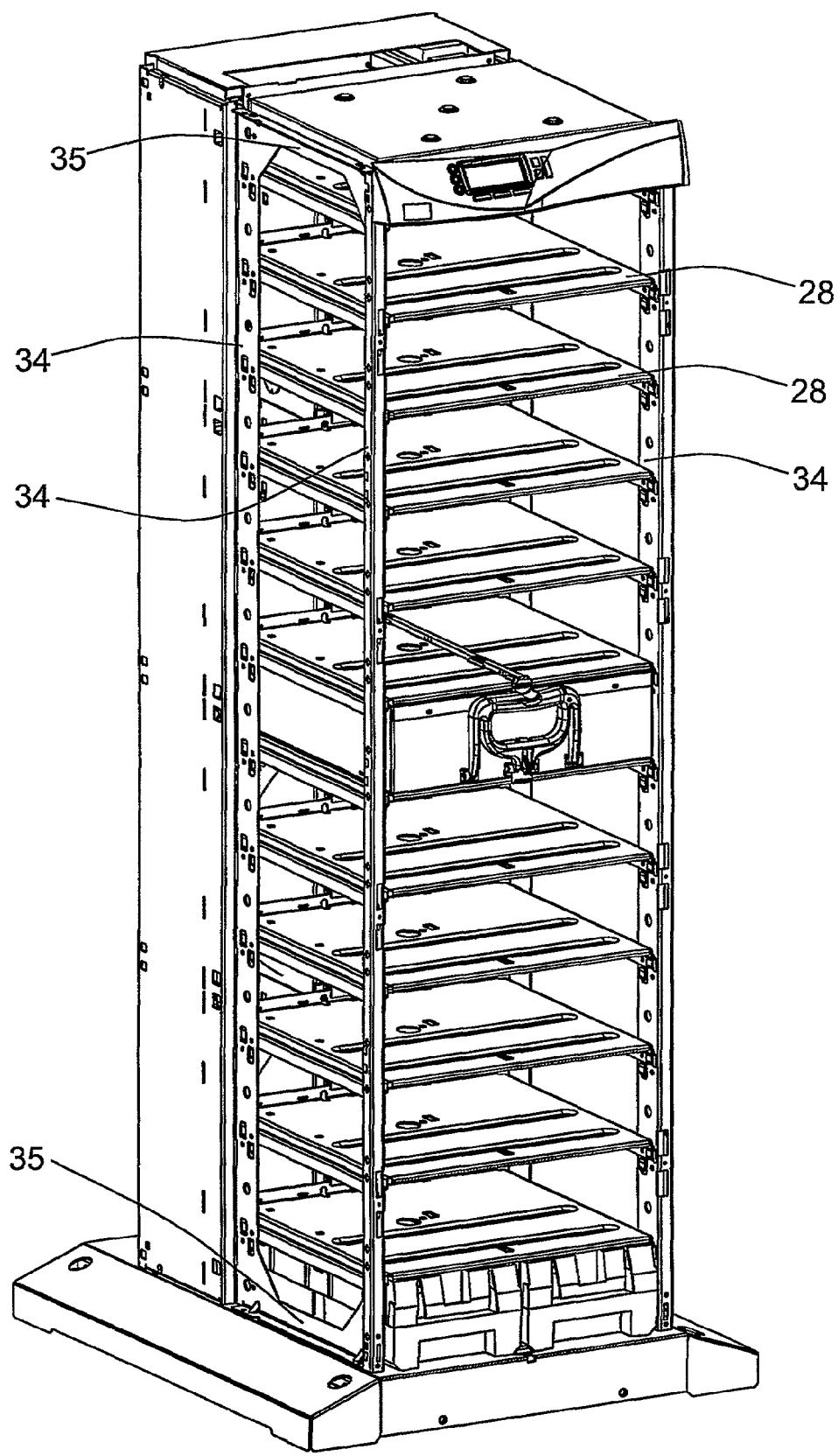
FIG. 11 is an isometric view of an electrical cabinet or chassis for configuring and supporting an UPS system similar to FIG. 1, but with the side panels and back panel removed.

The power supply cabinet 20 may include a support base 32 upon which individual sections 26 can be stacked. The cabinet 20 also includes an outer support housing which can be built out of various materials such as plastic, sheet metal, metal, structural foam, and other similar materials. In the illustrated embodiment, the housing includes a metal frame comprising vertical corner support bars 34 built initially on the support base 32. Referring to FIG. 11, adjacent vertical support bars 34 standing vertically upright from the cabinet 20 are connected and spaced apart by a web 35 of sheet metal material near the top and bottom of the support bars 34. Pairs of vertical support bars 34 are stamped and formed from a common sheet of metal. The vertical corner support bars 34 are covered by a front panel (not shown), a back panel 40, and side panels 38. The vertical height of the support bars 34 is determined by the number of bays desired and determines the number of sections 26 provided, e.g. 3, 6, 9, or 12. A top 42 that includes a user interface 43 including a display 45 extends across the top of the front panel, back panel 48 and side panel 38. In the illustrated embodiment the panels 38, 40 are formed of sheet metal, however other material may be used as previously indicated.

The side panels 38 and back panel 40 also include vents 44 for cooling purposes thereby preventing overheating of a UPS when in use. In the described embodiment and referring to FIG. 2, the vents 44 in the back panel 40 are all along the left hand side of the back panel 40 and recessed a couple of inches rearward from an interior surface 49 to receive rearwardly projecting fans 70 (FIG. 5a, 5b) of the power modules 24. In this manner, fans are positioned in close proximity with the vents 44 to facilitate cooling of the power modules 24.

Figure 3:
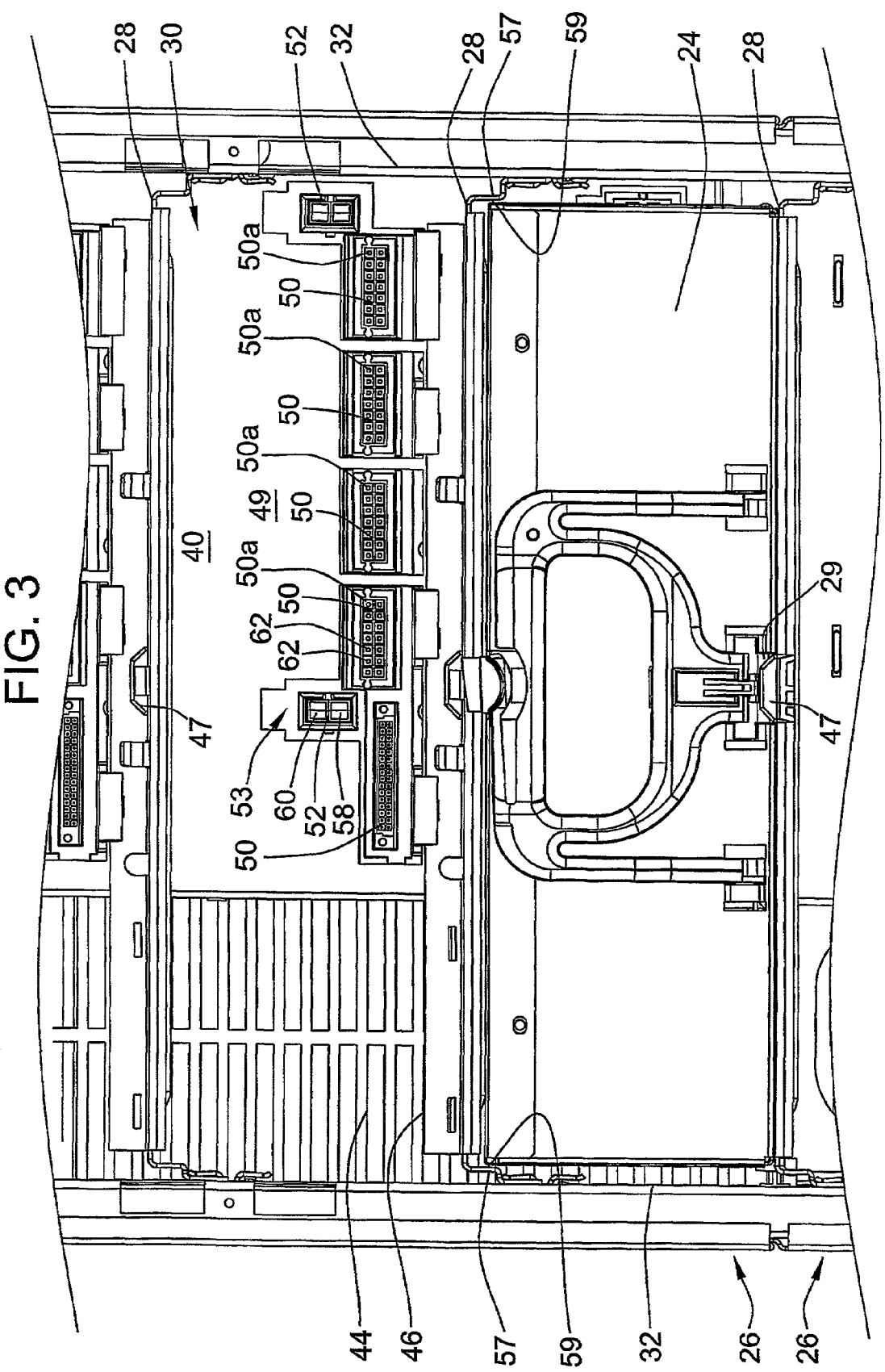
FIG. 3 is an enlarged fragmentary view of a portion of FIG. 2.
Figure 4:
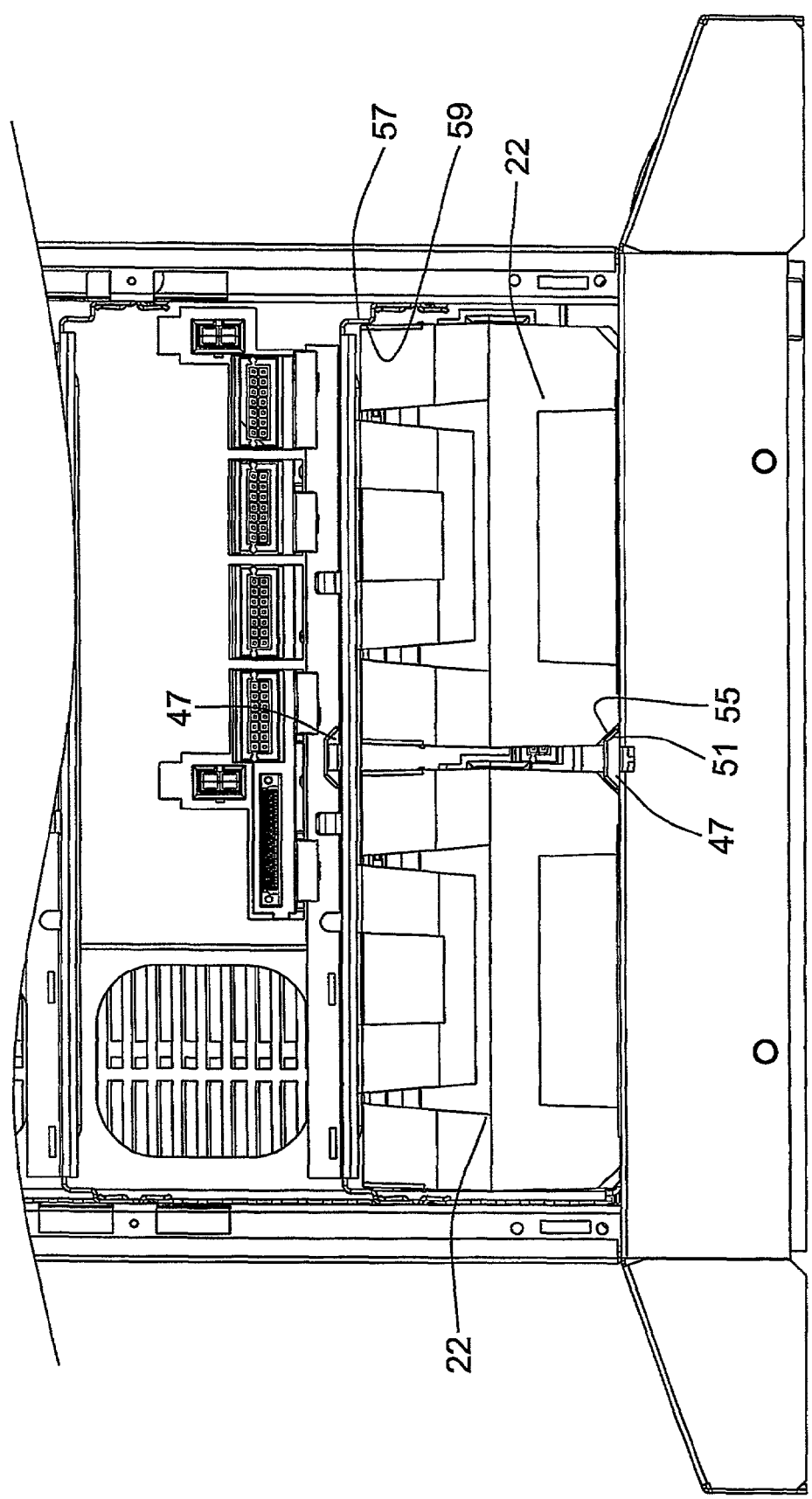
FIG. 4 if an enlarged fragmentary view of a portion of FIG. 2.
Figure 6A:
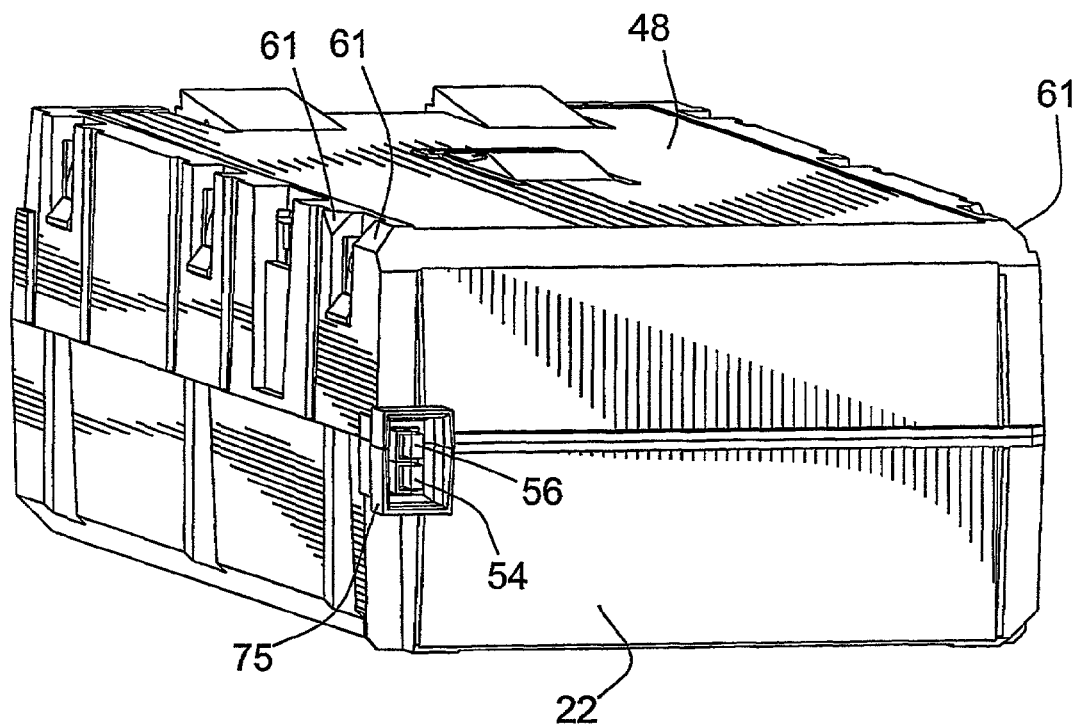
FIGS. 6a and 6b are rear isometric views of an individual battery of a battery pack for use with the electrical cabinet illustrated in FIGS. 1–2.
Figure 6B:
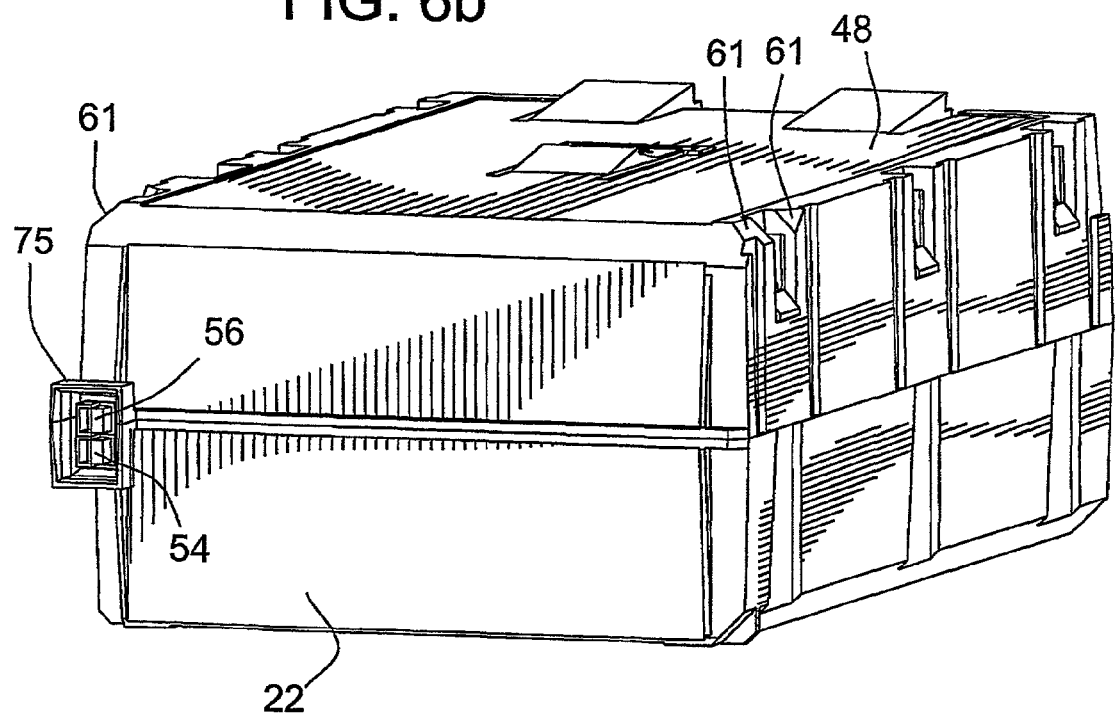

To provide the individual slots 30, individual shelves 28 extending horizontally are supported in parallel, vertically spaced apart relationship. Like the side and back panels 38, 40, the shelves 28 can be readily formed from sheet metal. The corners of the shelves 28 are snapped in, mounted, fastened or otherwise secured to the vertical support bars 34. The shelves 28 also include generally flat and generally smooth top surfaces 46 which allows battery packs 23 or power modules 24 to easily slide into and out of the slots 30. The upper surface of the support base 32 can also provide the first shelf 33, i.e. the bottom surface of the lower most slot 30. A plastic center rail 47 snaps into the center of each shelf 28 and extends rearwardly. Referring, also, now to FIG. 4, each center rail 47 provides beveled inner guide surfaces 51 that slide against corresponding inner beveled guide surfaces 55 of each battery pack 22 to align the battery packs 22 in the proper position for plugging into their respective terminals. Referring, also, now to FIG. 3, the housing 25 of power modules and battery chargers includes an elongate groove 29 that rides over the rail 47. The shelf 28 above each slot 30 includes a downward depending flange 57 on both side ends that provides parallel outer guide surfaces 59. The outer guide surfaces 59 engage and slide against both the outer surfaces of the battery packs 22 and power modules 24 as shown in FIGS. 3 and 4 to align the battery packs 22 and power modules 24 in the proper position for plugging into their respective terminals. Referring to FIGS. 6a and 6b, the battery packs 22 also include a beveled surface 61 that guides and eases insertion into the slots 30 against the outer guide surfaces 59.

In accordance with the present invention, the slots 30 are universal, readily capable of having either the power modules 24 or the two battery packs 22 inserted and plugged-in or otherwise electrically connected to the cabinet 20. In the described embodiment, different terminal connector locations have been selected for the battery packs 22 and the power modules 24 such that the locations of the respective terminals in each slot 30 do not interfere with one another. The battery packs 22 are approximately one-half the width of the power modules 24. The power module 24 and the two side by side battery packs 22 are sized closely and just smaller than the size of the slots 30 such that they substantially fill the slot and substantially align to plug into the respective terminal connectors on the back 49 of each slot. Thus, it is not only the cabinet 20 which is novel, but, also, the battery packs 22 and power modules 24 that are also novel by virtue of their similar sizes and the selected non-interfering locations of the respective terminal connectors.

Referring to FIG. 3, it can be seen that the back 49 of each slot 30 includes separate power module plug-in connectors 50 and battery terminal plug-in connectors 52 at different locations. Each battery pack 22 includes a positive and negative terminal 54, 56 in the form of projecting prongs or posts (FIGS. 6a and 6b). Since, in the illustrated embodiment, each slot 30 may accommodate two battery packs 22, the back 49 of each slot 30 includes two sets of battery terminal plug-in connectors 52 in the form of positive and negative electrical sockets 58, 60 positioned to align with positive and negative terminals 54, 56 for interfitting and electrically connecting with the positive and negative terminals 54, 56. Referring to FIG. 3, one of the battery terminal plug-in connectors 52 is located proximate the horizontal center of the slot 30 while the other battery terminal plug-in connector 52 is located proximate the right end of the slot 30. The plug-in connectors for the battery packs 22 are known as power connectors as they provide the raw power source or supply for the UPS system.

Figure 5A:
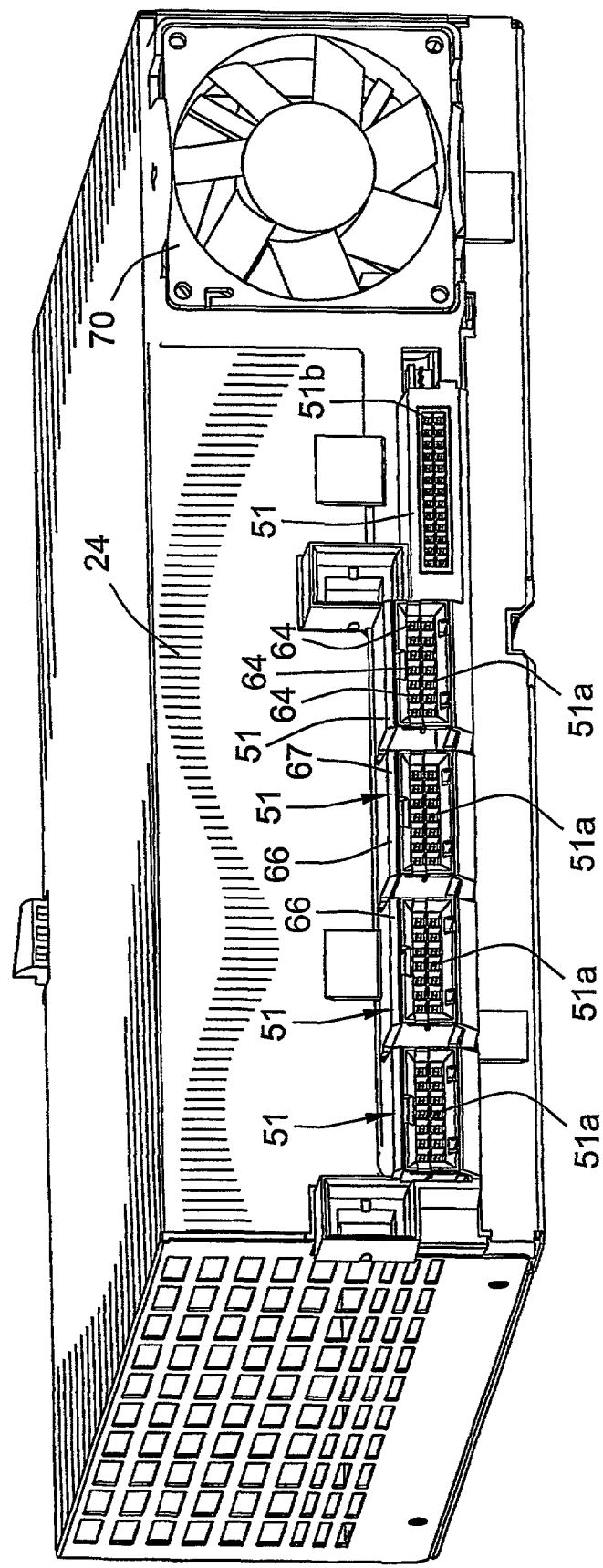
FIGS. 5a and 5b are rear isometric views of a power module for use with the electrical cabinet illustrated in FIGS. 1–2.
Figure 5B:
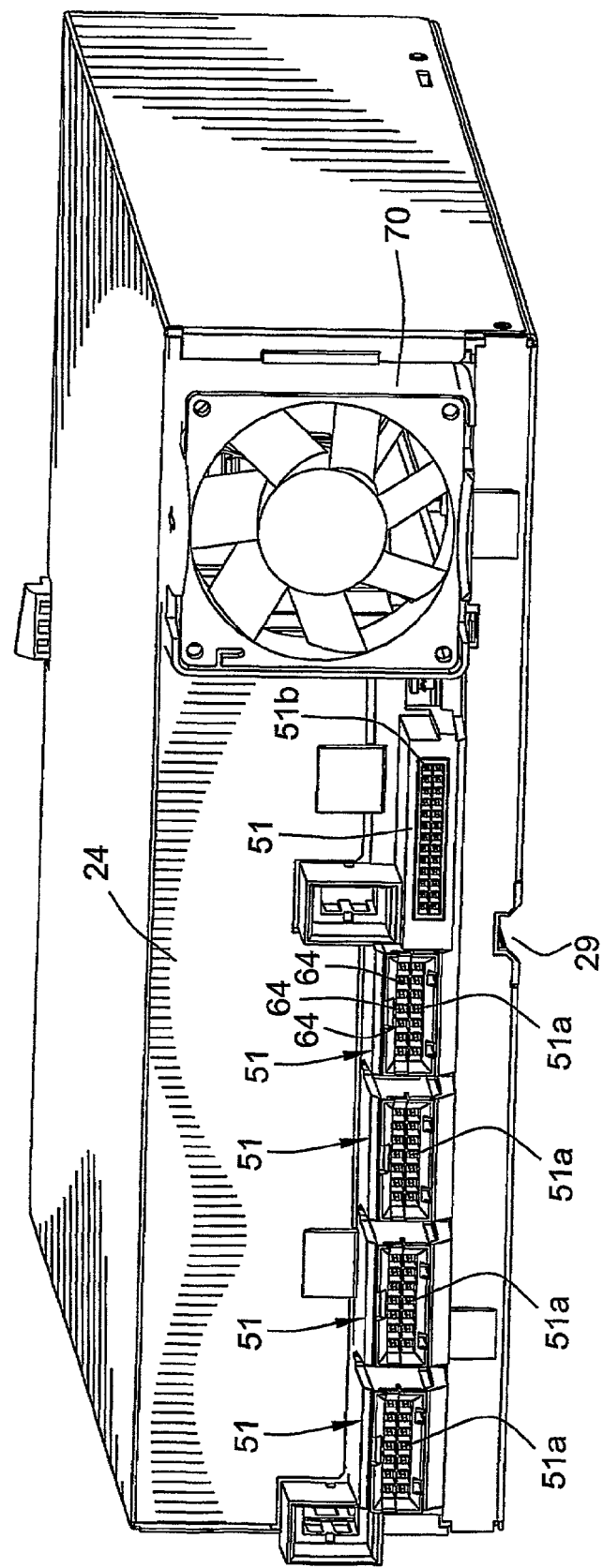

Similarly, the power module plug-in connectors 50 of the back panel 40 are positioned to connect with corresponding plug-in connectors 51 on the rear face of the power modules 24 (FIGS. 5a and 5b). The power module plug-in connectors 50 are provided horizontally proximate the bottom of the back surface 49 between the pair of battery terminal plug-in connectors 52. Each power module plug-in connector 50 includes multiple pin sized sockets 62 for interfitting and electrically contacting corresponding interfitting projecting pins 64 arranged in separate terminal connectors 51 on the back surface of the power module 24. The number of pins 64 allow for a variety of inputs, outputs and control of the power module 24 or are otherwise necessary for carrying large quantities of electrical power. In particular, the single terminal connector shown on the right hand side in FIG. 5a is a signal connector 51b and carries electronic control signals for controlling the operational output of the power module 24. The signal connector 51b plugs into a corresponding signal connector 50b (see FIG. 7) on the back panel 40. In contrast, the four other terminal connectors 51 are power connectors 51 a that receive the raw electrical power from the battery packs 22 and also output conditioned power for use. The power connectors 51a connect with corresponding power connectors 50a on the interior surface 49 of the back panel 40. The power module plug-in connectors 50 and battery terminal plug-in connectors 52 also do not interfere with the vents 44 and fans 70 which are aligned along the left hand side.

The slots 30 are universal and each can receive either a power module 24 or a battery pack 22 as desired to better meet the powering requirements of a particular application. No changes need to be made to the cabinet 20 to switch the number of power modules 24 or battery packs 22 so long as the total does not exceed the numbered slots 30. The full capacity of the cabinet 20 can be utilized before another cabinet 20 is required. The end user is able to add additional battery packs 22 or power modules 24 or switch locations of battery packs 22 and power modules 24 as desired without concern as to whether a slot 30 is dedicated to receive either a battery pack or power module.

Figure 7:
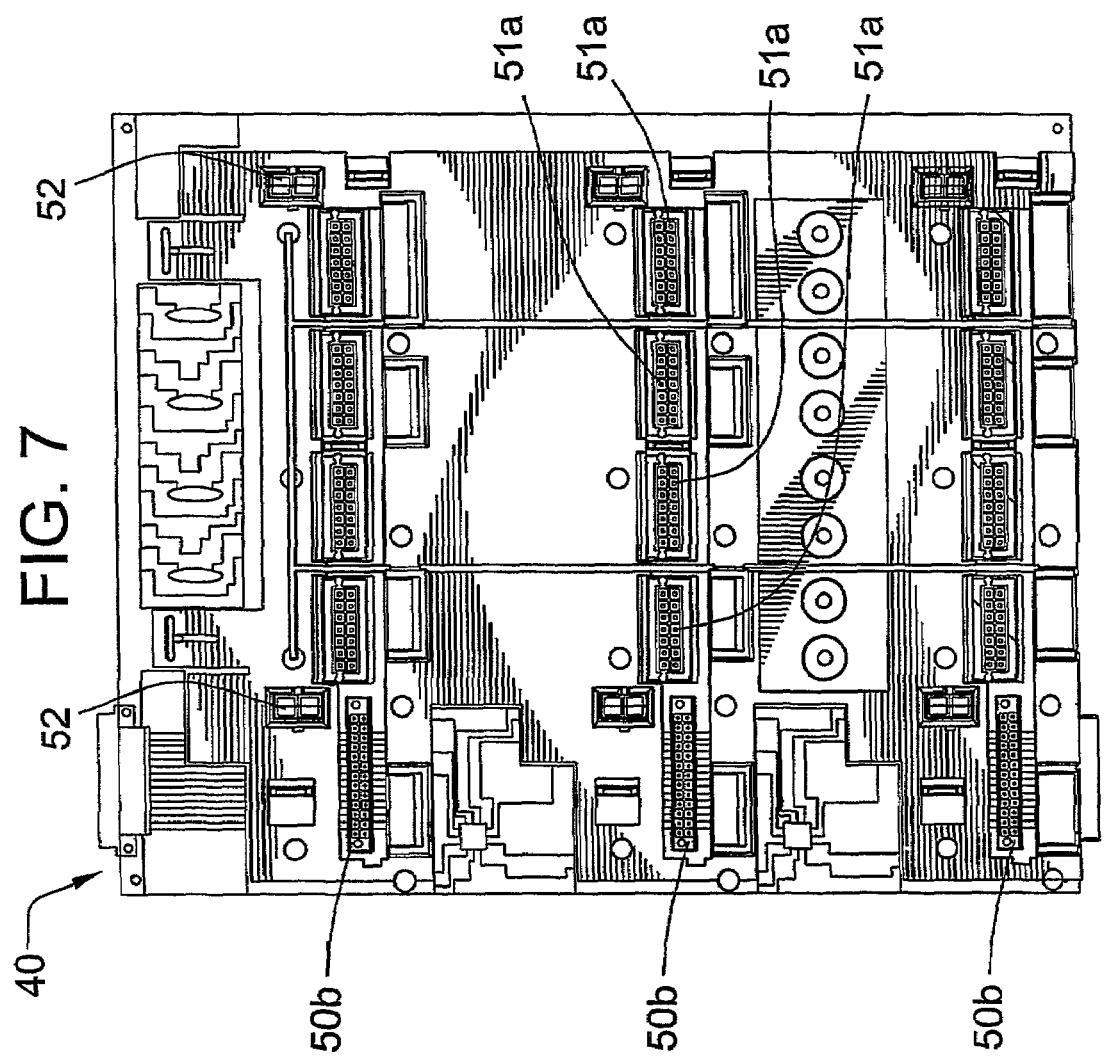
FIG. 7 is a front view of the back panel used in the battery cabinet of FIG. 1.
Figure 8:
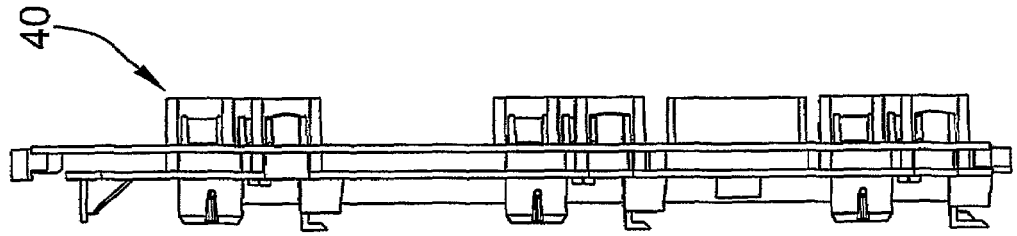
FIG. 8 is a side view of the back panel of FIG. 7.
Figure 9:
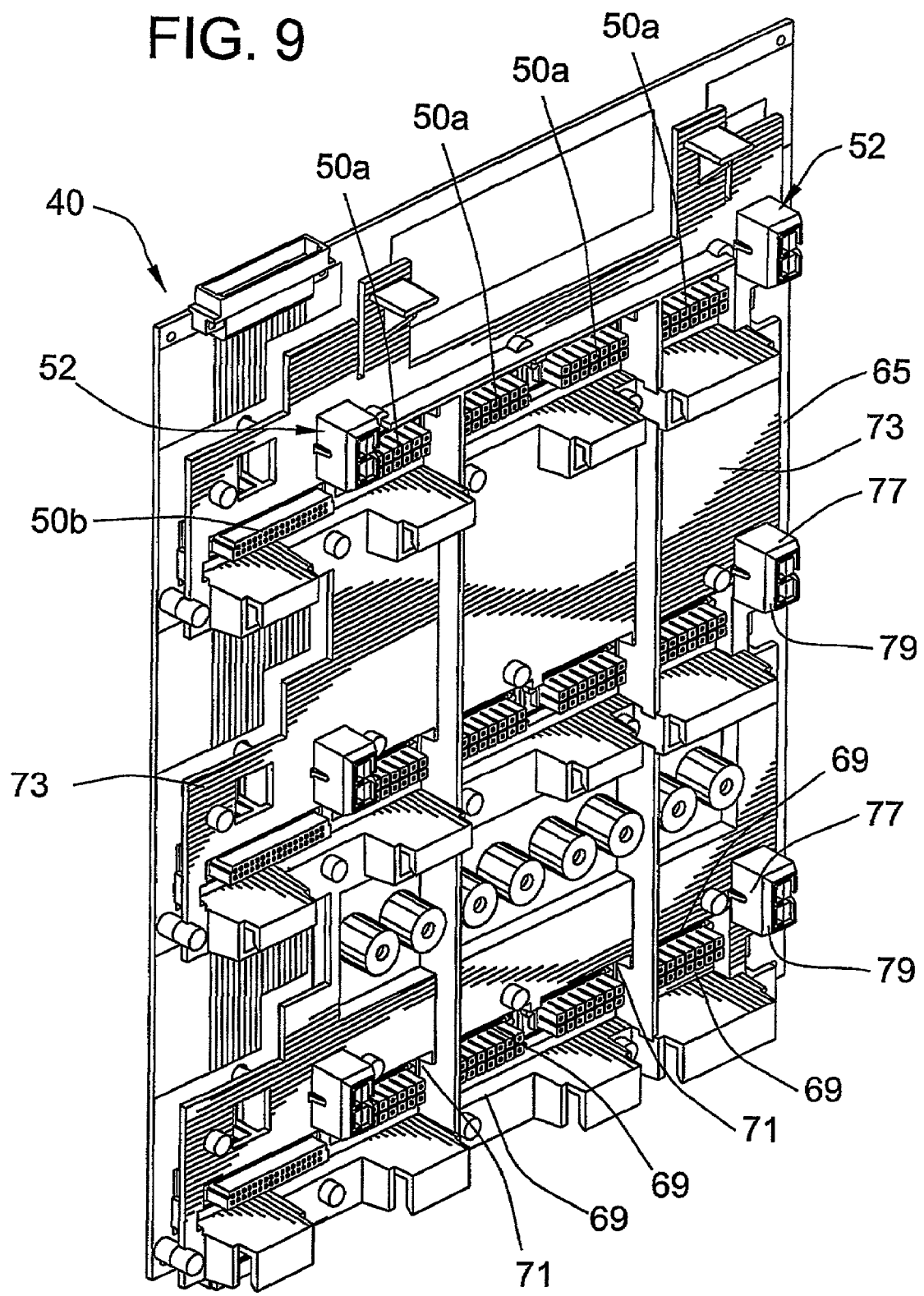
FIG. 9 is an isometric illustration of the back panel of FIG. 7.
Figure 10:
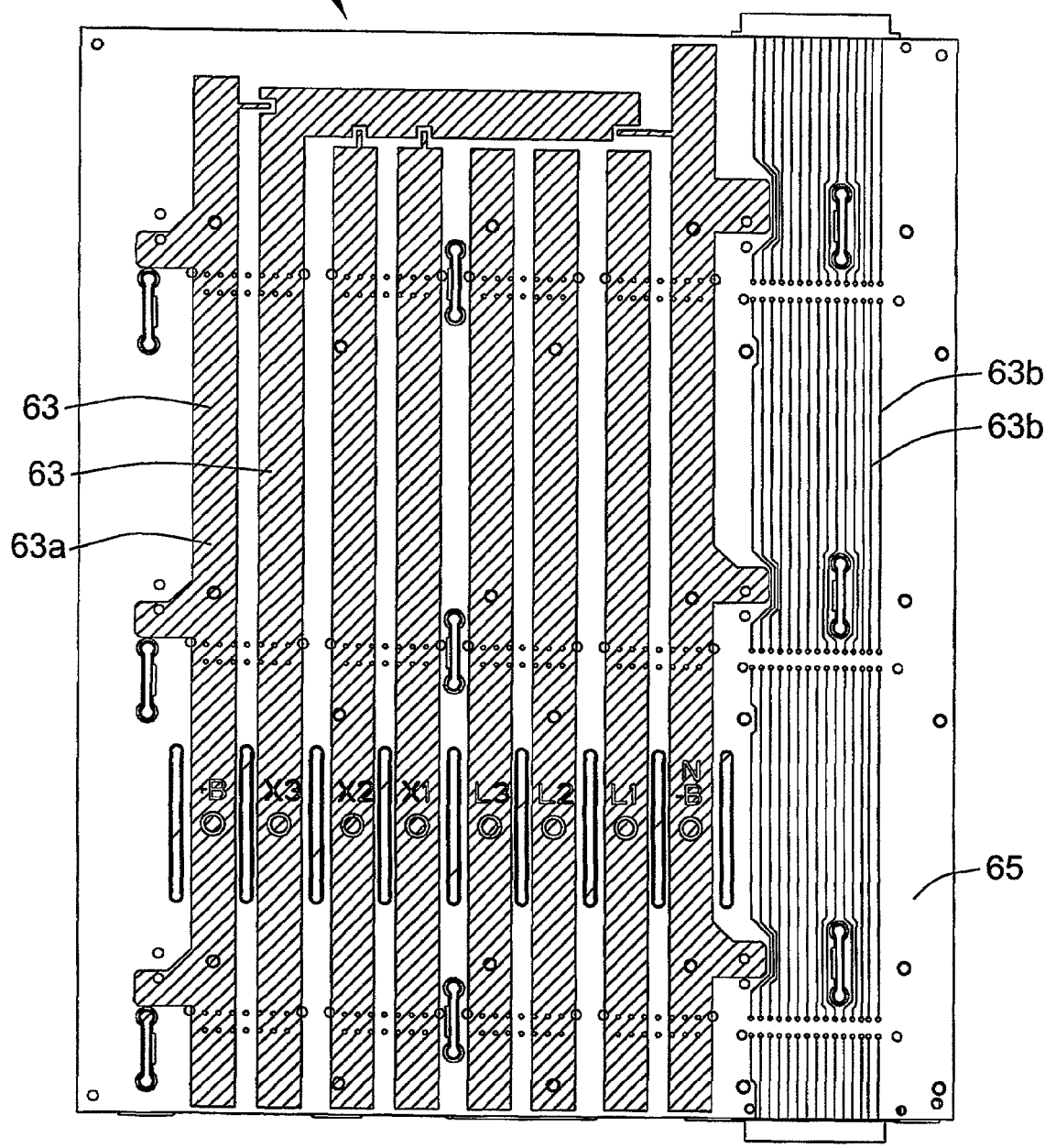
FIG. 10 is a rear view of the back panel of FIG. 7.

All of the plug-connectors 50, 52 are provided on a single back panel 40 that provides an electrical circuit connecting the various slots 30 in an operative manner. The back panel 40 of each section 26 is illustrated in FIG. 10 including a printed circuit board "back plane" in which traces 63 are etched on the back and front sides of a substrate board 65. Traces 63 include signal traces 63b and power traces 63a. The narrower signal traces 63b are electrically connected with sockets of signal connectors 50b and carry electronic control signals to the power modules 24. The wider power traces 63a are electrically connected with sockets of the power connectors 50a and carry the primary electrical power outputs of the battery packs 22 into the power modules 24 and also output the conditioned electrical power for usage. It will be appreciated by those skilled in the art that discrete wires may be used as an alternative to traces 63. The substrate board 65 supports the plug-in connectors 50a–b, 52 on the interior side of the back panel 40 as illustrated in FIGS. 7 and 9 (a side view of back panel 40 is illustrated in FIG. 8). The plug-in connectors 50a–b, 52 are electrically coupled to the traces 63 in an operative manner.

Guide mechanisms are also provided to precisely align the respective plug-in connectors of the battery packs 22 and the power modules 24 with the back panel 40. The guide mechanism for guiding the connection of the power modules 24 is illustrated in FIG. 5a and takes the form of rearwardly-extending plastic flanges 66 on the power modules 24 that co-act with corresponding structure on the back panel 40. The plastic flanges 66 have beveled guide surfaces 67 that engage the corners 69 (See FIG. 9) of receiving slots 71 defined on a plastic guide member 73 of the back panel 40 which is rigidly mounted on an interior facing side of the substrate board 65. The beveled guide surfaces 67 contact the corners 69 to adjust the position of the power module 24 slightly to ensure that the pins 64 are properly received into the sockets 62.

As illustrated in FIGS. 6a and 6b, the guide mechanism for guiding the connection of each battery pack 22 takes the form of an outer plastic guard 75 surrounding the positive and negative terminals 54, 56 that co-acts with and fits over a corresponding plastic guard 77 on the plastic guide member 73 of the back panel 40. The plastic guard 77 on the plastic guide member 73 includes beveled guide surfaces 79 that contact the corresponding guard 75 to adjust the position of the battery pack 22 slightly to ensure that the positive and negative terminals 54, 56 are properly received into the positive and negative sockets 58, 60.

The controller of the user interface 43 electronically polls each bay or slot 30 to determine whether a battery pack 22, a power module 24 or other device is provided in each of the slots 30. In the described embodiment the controller 43 measures electrical activity, such as the location of the voltage in each slot 30. For example, if electrical activity is sensed at the power module plug-in connectors 50 of a particular slot 30, then the controller 43 determines that a power module 24 is present in that slot 30. Similarly, if electrical activity is sensed associated with the battery terminal plug-in connectors 52 in a particular slot 30, then the controller 43 determines that a battery module 22 is present in that slot 30. The controller 43 can also detect and indicate whether there are any defects of the power module 24 or battery packs 22 by comparing sensed voltages or electrical signals to stored normal operating ranges, thereby providing an early warning to a UPS system maintenance technician. The polling is conducted at timed intervals such that the system automatically refreshes to reflect new information as power modules 24 or battery packs 22 are pulled or switched. Other sensor mechanisms can also be used, such as using indicator pins in the connectors to indicate a particular type of plug-in module. Such information can be gathered with the controller 43 and viewed on the display 45.

Figure 12:
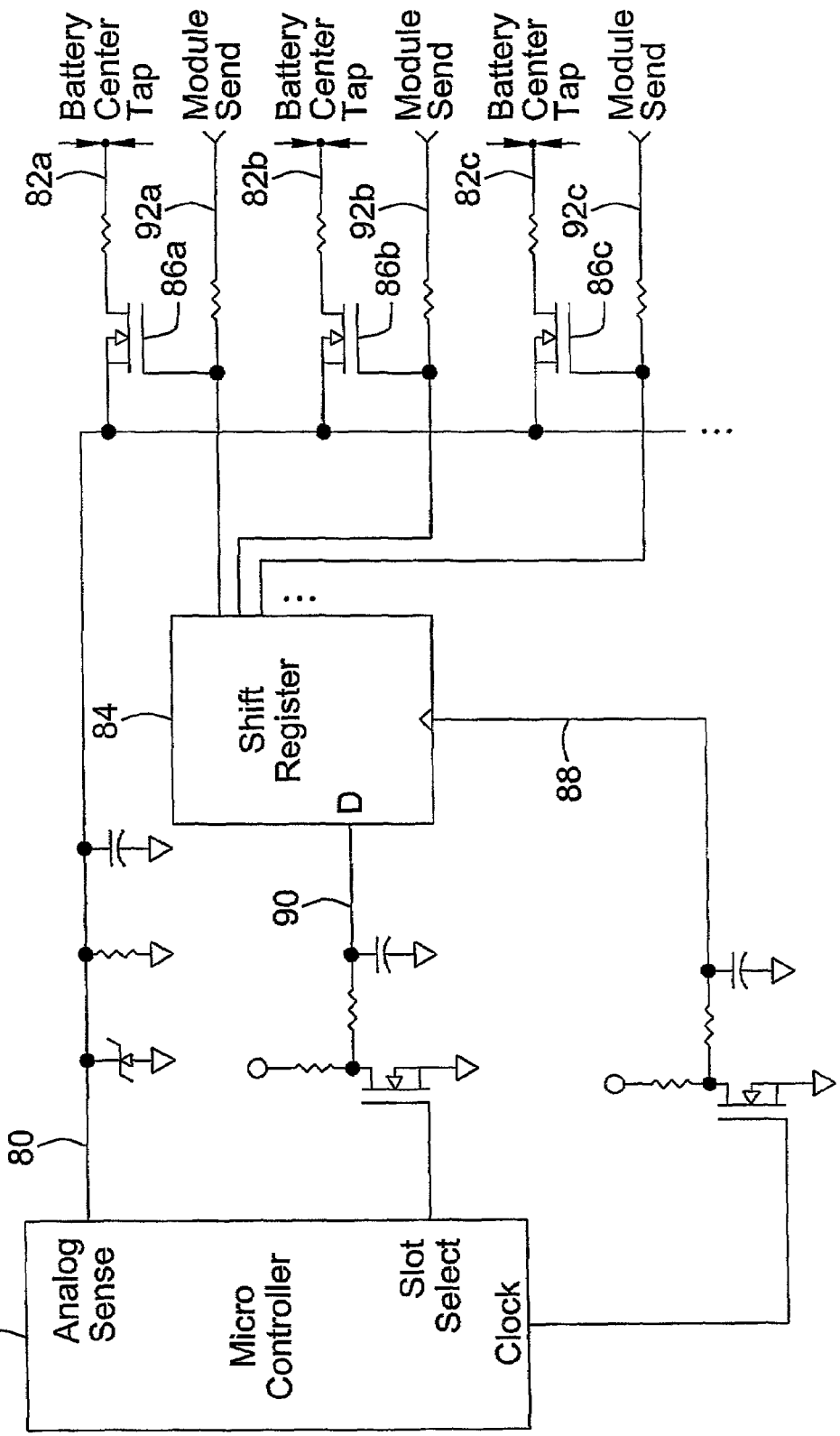
FIG. 12 is a simplified schematic diagram illustrating an embodiment of the battery center point sense circuitry in accordance with an embodiment of the present invention.

In one embodiment, a system for detecting defective battery packs in the modular, redundant uninterruptible power supply (UPS) system utilizes a single analog sense input 80 into microcontroller 43 as illustrated in FIG. 12. One skilled in the art will recognize, however, that individual analog sense inputs may be used as desired. The sense lines $82_{a-c}$ coupled to each of the battery center tap points on the back plane are selectively coupled to the single analog sense input 80 to allow the microcontroller 43 to sequentially monitor the voltage at each of these points. The selection circuitry in this embodiment includes a shift register 84 that sequentially enables an electronic switch, such as MOSFET $86_{a-c}$ to couple each of the sense lines $82_{a-c}$ to the single analog sense input 80. The shift register 84 operates in combination with a clock input 88 and a slot select input 90 from microcontroller 43. In this embodiment, a module send input 92$_{a-c}$ is also included to allow the microcontroller 43 to distinguish different types of modules that may occupy the individual slots, as will be described more fully below.

In the embodiment of the battery monitoring system of FIG. 12, the microcontroller 43 first establishes a baseline (all zeroes) position by clocking the shift register through its total cycle, e.g., 16 or more clock cycles for a typical shift register. Once this baseline all zeros position has been established, the microcontroller 43 sets the slot select line 90 high for one clock cycle. This causes shift register 84 to enable the first switch 86$_a$ to couple the sense line 82$_a$ to the analog sense input 80. The microcontroller 43 is then to sense the voltage at the battery center tap for this slot. Once this reading has been recorded, the slot select line 90 is taken low, and the shift register 84 is again clocked so that the next slot may be monitored when the slot select line 90 is again taken high. In this way, each of the individual slots will be polled by the microcontroller 43 in this sequential fashion. At each clock, the voltage on analog sense input will indicate the condition of the battery center tap for each of the subsequent slots.

As described above, the modular UPS chassis allows the installation of different types of modules therein. Specifically, each slot may accommodate a pair of battery packs, or a power module or battery charger. In a situation where a power module is installed in a slot, the voltage reading at the battery center tap sense line 82 for that particular slot will read zero. To allow the microcontroller 43 to differentiate this condition from a condition where batteries are installed but are inoperative, each slot also includes a module send input 92$_{a-c}$ as introduced above. In one embodiment of the present invention, the power modules and battery chargers will output a square wave on this module send line 92 to indicate their presence in the slot. During polling operation as the shift register 84 sequences to the slot having the power module installed therein, when shift register 84 enables the electronic switch, e.g., 86$_a$, the square wave on module send line 92$_a$ will result in the electronic switch 86$_a$ being turned on and off at the rate of the square wave. In this way, the microcontroller 43 can detect that a power module is installed in that particular slot.

In a preferred embodiment, the square wave is generated at a relatively slow frequency, e.g., one-tenth the clock rate. The microcontroller 43 is then able to detect the square wave by virtue of changes from zero to 5 volts every $10^{th}$ cycle to thereby "decide" that a power module is installed in this location. As an alternative to detecting the presence of a module, an additional signal "module send" could be sent to the module. If a module is present in that location, the module will send a formatted CAN signal to the interconnect board letting it know its system address. Interconnect board knows which slot the module is in since it counts the number of clock pulses sent out. If at any given data shift there is no CAN message or insufficient DC voltage is fed back, the system recognizes that the slot is empty.

Through the use of this system, the microcontroller 43 monitors the voltage at the center point of the two battery packs in each individual slot. As each pack is normally 60 volts in a typical UPS system, the nominal voltage at the battery center tap is 60 volts. Under normal operating conditions, this point will always be about one-half the total string voltage. During float charge operation during which the charge on each of the individual cells in the battery pack reaches approximately 2.47 volts, the center point is then increased to a nominal of approximately 74.1 volts (in a system having 30 cells per battery pack). At a low battery discharge point during load each cell may be reduced to approximately 1.75 volts, which therefore lowers the center point to approximately 52.5 volts under this operating condition. As these voltages are obviously greater than may be handled by a typical microcontroller 43, the individual voltage sense from each slot is divided down to a level safe for the microcontroller 43. In the embodiment illustrated in FIG. 12, the voltage input is scaled by one MΩ and a 63.4 kΩ resistor, and clamped by a Zener diode to a safe level to protect the microcontroller 43 from an overvoltage condition.

In operation, the microcontroller 43 polls each of the (3, 6, 9, or 12) slots in turn as discussed above. Initially, the microcontroller 43 will "learn" each position's nominal voltage, which will vary slightly due to resistor and battery pack tolerances. Primarily, the microcontroller 43 looks for consistency among the battery pairs in each slot. If any single slot varies by more than a predetermined amount from the other slots, the microcontroller 43 will flag that slot as having a problem. This consistency among the battery packs installed in the slots is checked during each of the various operating conditions. Nominally, the microcontroller 43 expects to see a voltage of approximately 3.58 volts in a quiescent state, 4.42 volts during a float charge mode, 3.13 volts during low battery discharge under load, and 0.0 volts when no batteries are installed in the slot. A typical variation in these values may be limited to approximately 1% upon proper selection of sensing components, although larger tolerance variations may be accommodated as needed. A variation from these numbers by more than a predetermined amount, e.g. by approximately 5% or more, will indicate that one or both of the batteries in the slot has failed. The individual readings from each of the individual slots are compared against the nominal values expected for each operating condition, and/or are compared against an average voltage value calculated from the voltage readings from all of the slots having batteries installed therein.

How the system reacts under different fault conditions allows the microcontroller 43 to detect which battery pack in a particular slot is defective. Recognizing that batteries typically fail high impedance (open cell, dry, or sulfated) different voltage readings during particular modes of operation may be used to identify which of the two battery packs in a particular slot is failed. For example, the microcontroller 43 will expect to see a nominal voltage during a quiescent mode of 3.58 volts when the "bottom" battery pack has failed open. With this same failure, a voltage of 5.10 volts (corresponding to the Zener clamping voltage) will be expected during the float charge mode of operation, and a voltage of 2.68 volts will be expected when the bottom battery pack is open during a low battery discharge under load condition. The "top" battery pack being failed open will result in a nominal voltage of 3.58 volts to be seen by the microcontroller 43 during all modes of operation. If both battery packs are failed open, or if no battery packs are properly installed in a particular slot, the microcontroller 43 will expect to see a voltage of zero volts. With this information, the microcontroller 43 can detect a defective battery by comparing the sensed voltages at the battery center tap either against themselves or a known nominal value. In this way, the operational readiness or lack thereof of the battery packs installed in each slots may be indicated.

Figure 13:
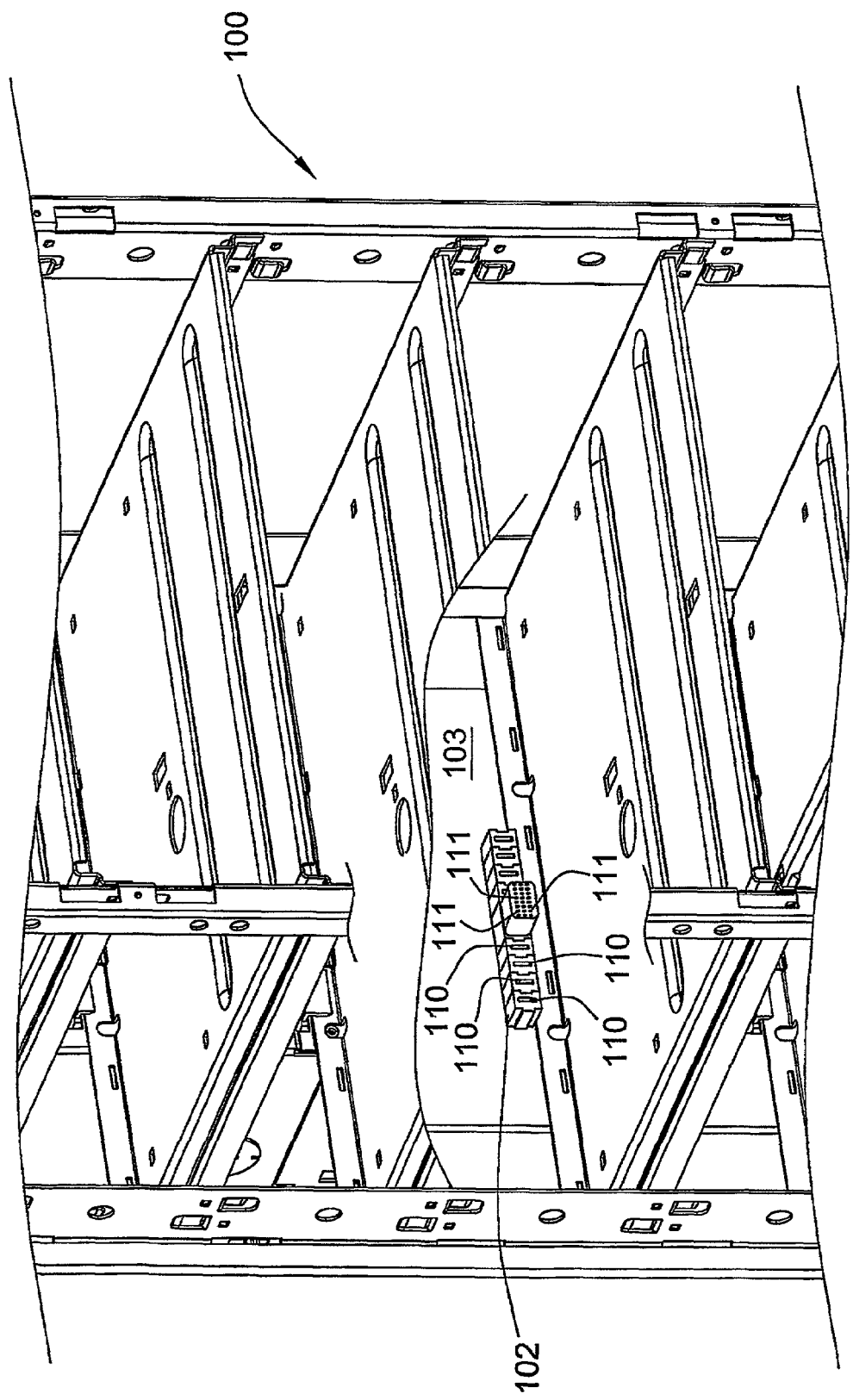
FIG. 13 is an enlarged, partially fragmentary, isometric view of an electrical cabinet according to an alternative embodiment of the present invention.
Figure 14:
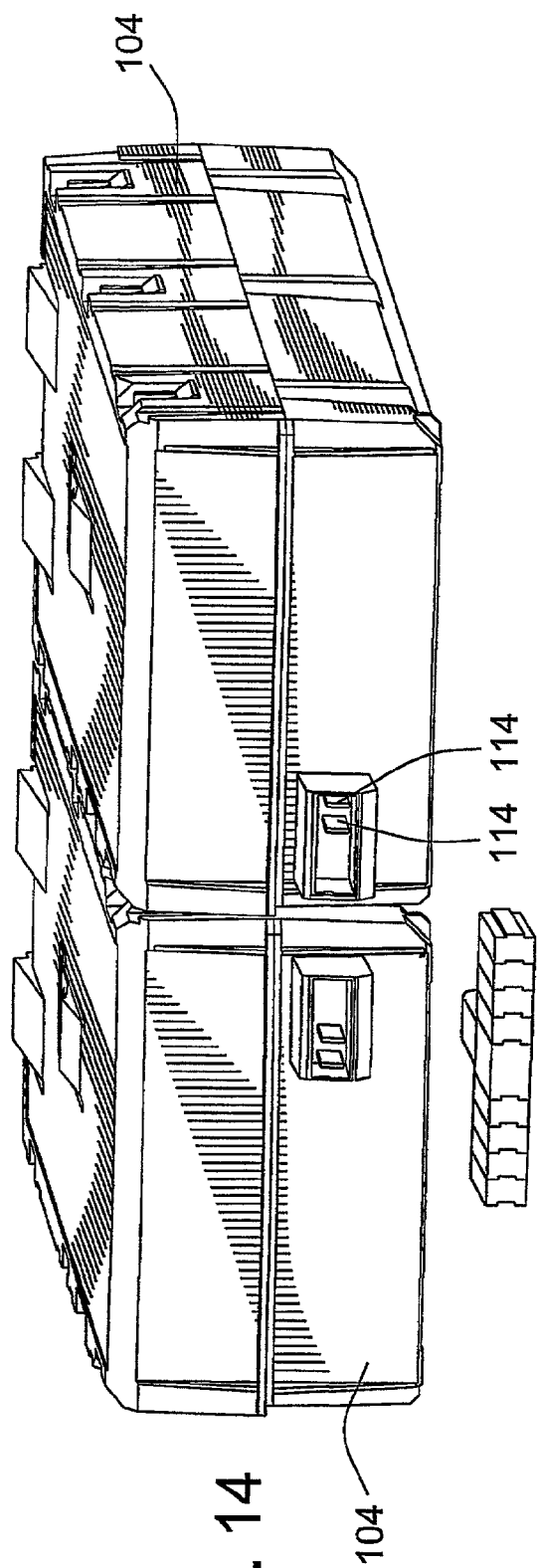
FIG. 14 is a isometric view of the rear end of a pair of battery packs adapted to be plugged into the common strip terminal connector of the battery cabinet shown in FIG. 13.
Figure 15:
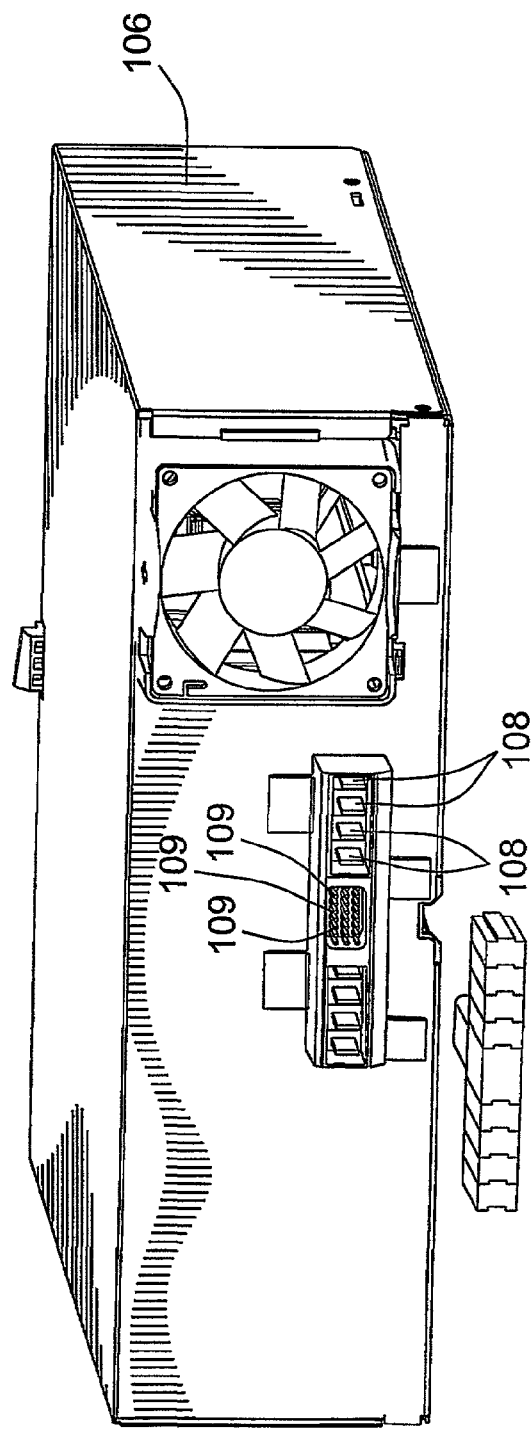
FIG. 15 is a isometric view of the rear end of a power module adapted to be plugged into the common strip terminal connector of the battery cabinet shown in FIG. 13.

An alternative embodiment of the present invention is illustrated in FIGS. 13–15 as a battery cabinet 100 having a single strip terminal connector 102 on a panel 103. Except for the configuration of the single strip terminal connector 102, the second embodiment is the same as the first embodiment. The single strip terminal connector 102 is adapted to plug into both battery packs 104 and power modules 106 and includes both signal connectors and power connectors. The power modules 106 include metal prongs 108 and pins 109 that plug into prong receiving sockets 110 and pin receiving sockets 111, respectively. The pins 109 act as signal connectors and transmit electronic control signals while the prongs 108 act as electrical power connectors and transmit the raw and/or conditioned electrical power. Each battery pack 104 also includes two prongs 114 that plug into two of the same prong receiving sockets 110 as for the power modules to provide the raw electrical power to the system. As such, two of the four prong receiving sockets 110 on each side of the terminal connector 102 are used for both battery packs and power modules.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A non-invasive method of monitoring operational readiness of electric power storage batteries in an uninterruptible power supply (UPS) system, the UPS system having at least one battery channel, each having at least two battery packs coupled in series to supply output power to a connected load and a battery charger to maintain and restore charge to the batteries during normal utility line operation, comprising the steps of:
   monitoring a voltage at a midpoint between the two battery packs during a quiescent state of operation of the battery packs;
   comparing the voltage to a first nominal value for the midpoint voltage during the quiescent state of operation of the battery packs;
   indicating a lack of operational readiness of both battery packs when the voltage at the midpoint is less than the first nominal value by a first predetermined amount.

2. The method of claim 1, wherein the UPS system includes a plurality of battery channels coupled in parallel with one another, and wherein the step of monitoring comprises the step of monitoring a voltage for each of the parallel coupled battery channels at a midpoint between the two battery packs during a quiescent state of operation, the method further comprising the steps of:
   calculating the first nominal value for the midpoint voltage during the quiescent state of operation of the battery packs as the average of the voltages monitored for each parallel coupled battery channel; and
   indicating a lack of operational readiness of a battery channel when the voltage at the midpoint of the battery packs for that channel is less than the first nominal value by the first predetermined amount.

3. The method of claim 1, further comprising the steps of:
   monitoring the voltage at a midpoint between the two battery packs during float charging of the battery packs;
   comparing the voltage to a second nominal value for the midpoint voltage during the float charging of the battery packs;
   indicating a lack of operational readiness of one of the two battery packs when the voltage at the midpoint varies from the second nominal value by a second predetermined amount.

4. The method of claim 3, wherein the step of indicating a lack of operational readiness of one of the two battery packs comprises the step of indicating a lack of operational readiness of a first one of the two battery packs when the voltage at the midpoint is greater than the second nominal value by the second predetermined amount.

5. The method of claim 3, wherein the step of indicating a lack of operational readiness of one of the two battery packs comprises the step of indicating a lack of operational readiness of a second one of the two battery packs when the voltage at the midpoint is less than the second nominal value by the second predetermined amount.

6. The method of claim 3, wherein the UPS system includes a plurality of battery channels coupled in parallel with one another, and wherein the step of monitoring comprises the step of monitoring a voltage for each of the parallel coupled battery channels at a midpoint between the two battery packs during the float charging, the method further comprising the steps of:
   calculating the second nominal value for the midpoint voltage during the float charging of the battery packs as the average of the voltages monitored for each parallel coupled battery channel; and
   indicating a lack of operational readiness of a battery channel when the voltage at the midpoint of the battery packs for that channel varies from the second nominal value by the second predetermined amount.

7. The method of claim 6, wherein the step of indicating a lack of operational readiness of a battery channel comprises the step of indicating a lack of operational readiness of a first one of the two battery packs of that battery channel when the voltage at the midpoint is greater than the second nominal value by the second predetermined amount.

8. The method of claim 6, wherein the step of indicating a lack of operational readiness of a battery channel comprises the step of indicating a lack of operational readiness of a second one of the two battery packs of that battery channel when the voltage at the midpoint is less than the second nominal value by the second predetermined amount.

9. The method of claim 1, further comprising the steps of:
   monitoring the voltage at a midpoint between the two battery packs at a state of discharge of the battery packs;
   comparing the voltage to a third nominal value for the midpoint voltage during the state of discharge of the battery packs;
   indicating a lack of operational readiness of one of the two battery packs when the voltage at the midpoint varies from the third nominal value by a third predetermined amount.

10. The method of claim 9, wherein the step of indicating a lack of operational readiness of one of the two battery packs comprises the step of indicating a lack of operational readiness of a first one of the two battery packs when the voltage at the midpoint is less than the third nominal value by the third predetermined amount.

11. The method of claim 9, wherein the step of indicating a lack of operational readiness of one of the two battery packs comprises the step of indicating a lack of operational readiness of a second one of the two battery packs when the voltage at the midpoint is greater than the third nominal value by the third predetermined amount.

12. The method of claim 9, wherein the UPS system includes a plurality of battery channels coupled in parallel with one another, and wherein the step of monitoring comprises the step of monitoring a voltage for each of the parallel coupled battery channels at a midpoint between the two battery packs during the state of discharge, the method further comprising the steps of:
calculating the third nominal value for the midpoint voltage during the state of discharge of the battery packs as the average of the voltages monitored for each parallel coupled battery channel; and
indicating a lack of operational readiness of a battery channel when the voltage at the midpoint of the battery packs for that channel varies from the third nominal value by the third predetermined amount.

13. The method of claim 12, wherein the step of indicating a lack of operational readiness of a battery channel comprises the step of indicating a lack of operational readiness of a first one of the two battery packs of that battery channel when the voltage at the midpoint is less than the third nominal value by the third predetermined amount.

14. The method of claim 12, wherein the step of indicating a lack of operational readiness of a battery channel comprises the step of indicating a lack of operational readiness of a second one of the two battery packs of that battery channel when the voltage at the midpoint is greater than the third nominal value by the third predetermined amount.

15. A method of detecting and identifying a failed battery pack in an uninterruptible power supply (UPS) system, the UPS system having a plurality of parallel connected slots into which may be coupled battery packs, power modules, or battery chargers as determined and configured by a user, the slots being adapted to accommodate two battery packs and providing a series coupling therebetween, the method comprising the steps of:
detecting a presence and type of equipment installed in each slot;
monitoring a voltage present at the series coupling between the two battery packs for each slot into which is installed battery packs;
calculating an average midpoint voltage for all slots having battery packs installed therein;
comparing the voltage for each slot to the average midpoint voltage for all slots; and
identifying a failed battery pack within a slot when the voltage for its associated slot deviates from the average midpoint voltage by a predetermined amount.

16. The method of claim 15, further comprising the steps of:
comparing the voltage for each slot to a predetermined expected value; and
identifying a failed battery pack within a slot when the voltage for its associated slot deviates from the predetermined expected value by a predetermined amount.

17. The method of claim 16, further comprising the step of determining an operating mode of the battery packs, and wherein the step of comparing the voltage for each slot to the predetermined expected value comprises the step of comparing the voltage for each slot to an operating mode specific predetermined expected value, and wherein the step of identifying a failed battery pack within a slot when the voltage for its associated slot deviates from the predetermined expected value by the predetermined amount comprises the step of identifying a failed battery pack within a slot when the voltage for its associated slot deviates from the operating mode specific predetermined expected value by the predetermined amount.

18. The method of claim 17, wherein the step of determining an operating mode of the battery packs determines that the battery packs are operating in a quiescent mode, and wherein the step of identifying a failed battery pack within a slot comprises the step of identifying both battery packs as failed when the voltage for their associated slot is less than a first predetermined value by a first predetermined amount.

19. The method of claim 17, wherein the step of determining an operating mode of the battery packs determines that the battery packs are operating in a float charging mode, and wherein the step of identifying a failed battery pack within a slot comprises the step of identifying a first one of the two battery packs within the slot as failed when the voltage for its associated slot is less than a second predetermined value by a second predetermined amount, and identifying a second one of the two battery packs within the slot as failed when the voltage for its associated slot is greater than a third predetermined value by a third predetermined amount.

20. The method of claim 17, wherein the step of determining an operating mode of the battery packs determines that the battery packs are operating in a discharging mode, and wherein the step of identifying a failed battery pack within a slot comprises the step of identifying a first one of the two battery packs within the slot as failed when the voltage for its associated slot is less than a fourth predetermined value by a fourth predetermined amount, and identifying a second one of the two battery packs within the slot as failed when the voltage for its associated slot is greater than a fifth predetermined value by a fifth predetermined amount.

21. The method of claim 15, wherein the step of detecting a presence and type of equipment installed in each slot comprises the step of polling each slot for an equipment type identifier.

22. A system for detecting defective battery packs in a modular, redundant uninterruptible power supply (UPS) system, the UPS system having a plurality of parallel connected slots into which may be coupled the battery packs, power modules, or battery chargers as determined and configured by a user, each slot being adapted to accommodate two battery packs and to provide a series coupling therebetween, the system comprising:
a voltage sense circuit coupled to each series coupling of each slot and operable to generate a voltage sense signal in response to a voltage present thereon;
a voltage sense selector circuit coupled to each of the voltage sense circuits, the voltage sense selector circuit operable to selectively enable the voltage sense circuits;
a controller operably coupled to the voltage sense selector circuit to command the voltage sense selector circuit to enable of a particular voltage sense circuit for a particular slot, the controller reading the voltage sense signal for the particular slot from the voltage sense circuit; and wherein said controller compares the voltage sense signal for the particular slot to a predetermined expected value and identifies an operational status of the battery packs based thereon.

23. The system of claim 22, wherein the controller reads the voltage sense signal for each slot in which battery packs are installed, calculates an average voltage value, and compares the voltage sense signal for each slot to the average voltage value to identify the operational status of the battery packs for each slot.

24. The system of claim 23, wherein the controller reads the voltage sense signal for each slot in which battery packs are installed during a float charge mode, compares the voltage sense signal for each slot to an expected voltage value for the float charge mode, and identifies a first one of the battery packs in a slot as defective when the voltage sense signal for an associated slot is less than the expected voltage value for the float charge mode, and identifies a second one of the battery packs in a slot as defective when the voltage sense signal for the associated slot is greater than the expected voltage value for the float charge mode.

25. The system of claim 23, wherein the controller reads the voltage sense signal for each slot in which battery packs are installed during a discharge mode, compares the voltage sense signal for each slot to an expected voltage value for the discharge mode, and identifies a first one of the battery packs in a slot as defective when the voltage sense signal for an associated slot is less than the expected voltage value for the discharge mode, and identifies a second one of the battery packs in a slot as defective when the voltage sense signal for the associated slot is greater than the expected voltage value for the discharge mode.

26. The system of claim 22, wherein the voltage sense selector circuit comprises a shift register having a clock input and a slot select input from the controller, the shift register sequentially generating a plurality of output enable signals in response to the clock input and the slot select input from the controller, each of the output enable signals operative to turn on a switching element to connect the voltage sense circuit to the controller.

27. The system of claim 26, wherein the switching element is a metal oxide silicon field effect transistor (MOSFET).

* * * * *

UNITED STATES PATENT AND TRADEMARK OFFICE
CERTIFICATE OF CORRECTION

| | | |
|---|---|---|
| PATENT NO. | : 7,132,833 B2 | Page 1 of 1 |
| APPLICATION NO. | : 10/031815 | |
| DATED | : November 7, 2006 | |
| INVENTOR(S) | : David Layden et al. | |

It is certified that error appears in the above-identified patent and that said Letters Patent is hereby corrected as shown below:

Title Page # 75
In the listing of inventors, the city name for David Layden is incorrectly listed as "Lisbon, WI." The correct city name is --New Lisbon, WI.--

Title Page #57
In the first sentence of the abstract, "uninterruptibe" is incorrectly spelled. It should be correctly spelled --uninterruptible.--

In the last sentence of the abstract, the word "battery" is missing. The sentence should read --This circuitry monitors the battery packs in each slot, and isolates any detected fault to a particular battery pack.--

Signed and Sealed this

Sixth Day of February, 2007

JON W. DUDAS
*Director of the United States Patent and Trademark Office*